United States Patent
Ozeki et al.

(10) Patent No.: US 10,793,101 B2
(45) Date of Patent: Oct. 6, 2020

(54) AIRBAG DEVICE

(71) Applicant: TOYODA GOSEI CO., LTD., Kiyosu-shi, Aichi-ken (JP)

(72) Inventors: Makoto Ozeki, Kiyosu (JP); Takashi Sasaki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 83 days.

(21) Appl. No.: 16/045,854

(22) Filed: Jul. 26, 2018

(65) Prior Publication Data
US 2019/0039560 A1 Feb. 7, 2019

(30) Foreign Application Priority Data

Aug. 3, 2017 (JP) .................................. 2017-151111
Mar. 20, 2018 (JP) .................................. 2018-53154

(51) Int. Cl.
*B60R 21/217* (2011.01)
*B60R 21/36* (2011.01)

(52) U.S. Cl.
CPC ............ *B60R 21/36* (2013.01); *B60R 21/217* (2013.01)

(58) Field of Classification Search
CPC .......................... B60R 21/2171; B60R 21/217
See application file for complete search history.

(56) References Cited

U.S. PATENT DOCUMENTS

| 5,765,867 | A  | * | 6/1998  | French  ................... | B60R 21/16  |
|           |    |   |         |                            | 280/743.1   |
| 8,628,111 | B2 | * | 1/2014  | Sugimoto ............. | B60R 21/207 |
|           |    |   |         |                            | 280/729     |
| 8,641,085 | B2 | * | 2/2014  | Przybysz .............. | B60R 21/233 |
|           |    |   |         |                            | 280/729     |
| 9,487,176 | B2 | * | 11/2016 | Loos ...................... | B60R 21/231 |
| 9,731,634 | B2 | * | 8/2017  | Kanto ................ | B60N 2/42763|
| 10,035,488| B2 | * | 7/2018  | Nagata ................ | B60R 21/2171|
| 10,486,633| B2 | * | 11/2019 | Kino .................... | B60R 21/2165|
| 2007/0085305 | A1 | * | 4/2007 | Feller ..................... | B60R 21/231 |
|           |    |   |         |                            | 280/728.2   |

(Continued)

FOREIGN PATENT DOCUMENTS

| DE | 102018118700 A1 * | 2/2019 | ............ B60R 21/36 |
| JP | 2011-500438 A     | 1/2011 |                         |

(Continued)

*Primary Examiner* — Nicole T Verley
(74) *Attorney, Agent, or Firm* — Posz Law Group, PLC

(57) ABSTRACT

An airbag device includes an airbag and an inflator stored inside the airbag. The inflator includes an inflator body and a mounting member that protrudes from the circumference of the inflator body generally orthogonally to an axial direction of the inflator body. The airbag includes an insertion region via which the inflator is inserted into the airbag. The insertion region has a double wall structure of an outer panel and an inner panel, and includes one or more through holes that are formed through the outer panel and inner panel for receiving the mounting member of the inflator. The outer panel includes an outer slit via which the inflator is inserted into the airbag, and the inner panel includes an inner slit via which the inflator is inserted into the airbag. The outer slit and inner slit are so arranged as not to overlap or intersect each other.

14 Claims, 26 Drawing Sheets

(56) References Cited

U.S. PATENT DOCUMENTS

| | | | | |
|---|---|---|---|---|
| 2010/0096841 A1* | 4/2010 | Tanaka | ................ | B60R 21/2032 |
| | | | | 280/730.1 |
| 2012/0025498 A1* | 2/2012 | Tanaka | ................. | B60R 21/233 |
| | | | | 280/730.2 |
| 2014/0333051 A1* | 11/2014 | Jo | ..................... | B60R 21/2171 |
| | | | | 280/728.2 |
| 2017/0057386 A1* | 3/2017 | Kanto | ................ | B60N 2/42763 |
| 2019/0100165 A1* | 4/2019 | Nakano | ................ | B60R 21/217 |
| 2019/0299918 A1* | 10/2019 | Ozeki | .................... | B60R 21/36 |
| 2019/0359165 A1* | 11/2019 | Kobayashi | ........ | B60R 21/23138 |

FOREIGN PATENT DOCUMENTS

| | | | | |
|---|---|---|---|---|
| JP | 2017-81248 A | 5/2017 | | |
| WO | WO-2011065385 A1 * | 6/2011 | ....... | B60R 21/23138 |
| WO | WO-2018228831 A1 * | 12/2018 | ....... | B60R 21/23138 |

\* cited by examiner

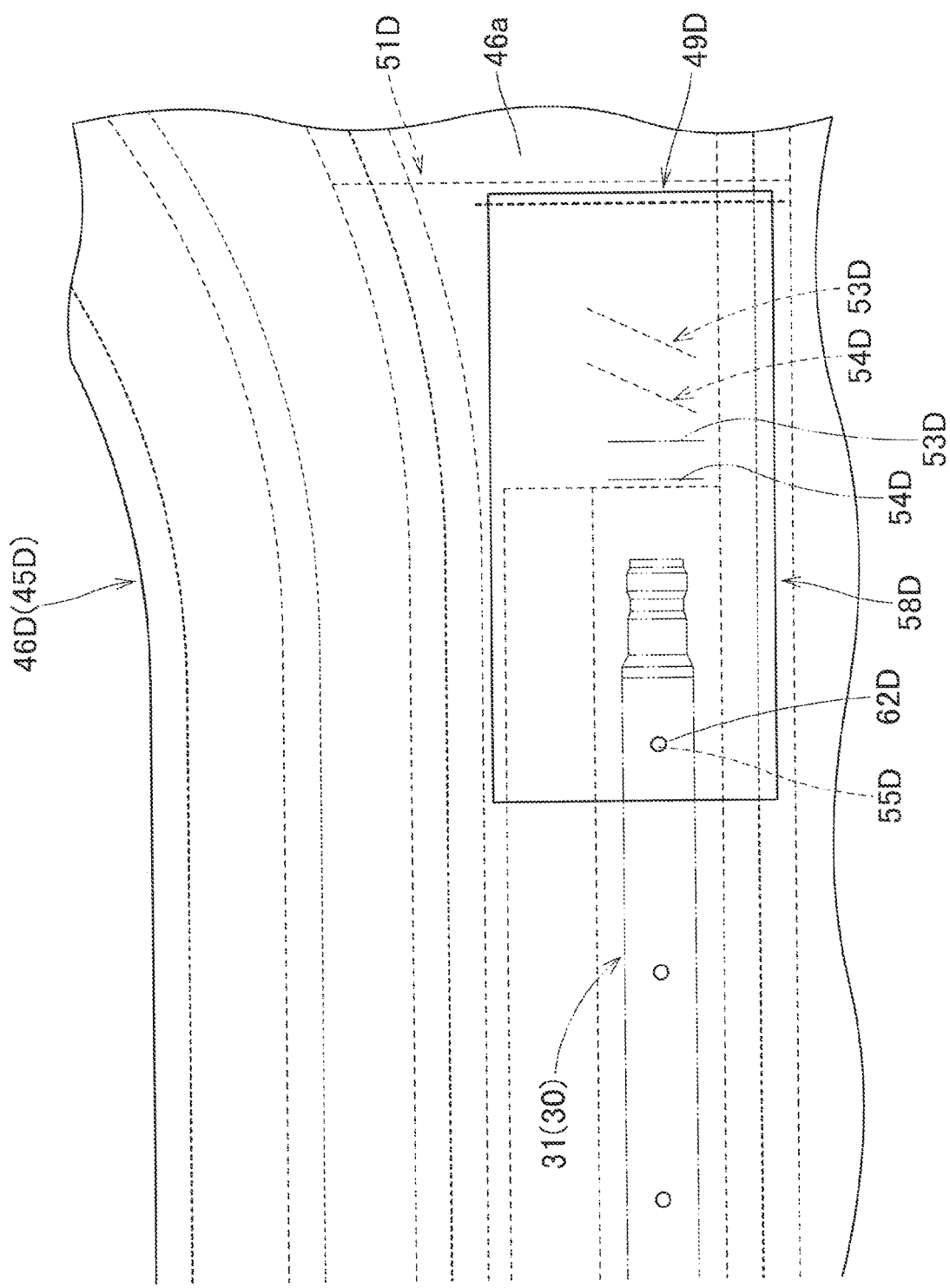

AIRBAG DEVICE

CROSS REFERENCE TO RELATED APPLICATIONS

The present application claims priority from Japanese Patent Application No. 2017-151111 of Ozeki et al., filed on Aug. 3, 2017 and Japanese Patent Application No. 2018-053154 of Ozeki et al., filed on Mar. 20, 2018, the entire disclosures of which are incorporated herein by reference.

BACKGROUND OF THE INVENTION

1. Field of the Invention

The present invention relates to an airbag device adapted to be mounted on a vehicle. More particularly, the invention relates to an airbag device that includes an airbag inflatable with an inflation gas and an inflator for feeding the inflation gas to the airbag.

2. Description of Related Art

JP 2017-81248 A discloses a known airbag device which includes an airbag inflatable with an inflation gas and an inflator for feeding the inflation gas to the airbag.

The inflator is formed into a cylinder and provided with a mounting member which protrudes from an outer circumference of the inflator. The inflator is stored inside the airbag such that the mounting member protrudes from the airbag, and the airbag and inflator are mounted on a vehicle body structure by fixing the mounting member to the vehicle body structure. The airbag includes an insert opening via which the inflator is inserted into the airbag. The insert opening of this airbag is composed of a combination of two slits. Specifically, an area of the airbag provided with the insert opening has a double wall structure, and each of the walls includes a slit such that the two slits intersect each other to form the insert opening. The airbag further includes a cover cloth that covers the insert opening from the outside. In this conventional airbag device, the inflator is inserted into one of the slits and the other from its first end. The inflator is stored in the airbag such that the first end region is placed inside the airbag and a second end region protrudes out of the insert opening.

In the above conventional airbag, it is conceivable to increase the length of one of or both of the slits in order to facilitate an insertion of the inflator. This, however, can form a gap between the inflator and a portion of the airbag around the insert opening, which is liable to cause a gas leakage from the gap despite the presence of the cover cloth.

SUMMARY OF THE INVENTION

The object of the present invention is to provide an airbag device that is capable of preventing gas leakage from an airbag despite the configuration that an inflator is stored inside the airbag.

The object of the invention will be attained by the following airbag device:

The airbag device includes an airbag inflatable with an inflation gas, and an inflator that is stored inside the airbag for feeding the airbag with the inflation gas. The inflator includes an inflator body that is generally cylindrical in outer contour and placed inside the airbag and a mounting member that protrudes from an outer circumference of the inflator body generally orthogonally to an axial direction of the inflator body, and protrudes out of the airbag to be mounted on a body structure of a vehicle in order to mount the airbag and inflator body on the body structure of the vehicle.

The airbag includes an insertion region via which the inflator is inserted into the airbag. The insertion region has a double wall structure of an outer panel and an inner panel each formed of a flexible sheet material. The insertion region includes an outer slit and an inner slit for receiving the inflator, and one or more through holes that are formed through the outer panel and inner panel and allow the mounting member of the inflator to protrude out of the airbag. The outer slit is formed on the outer panel, the inner slit is formed on the inner panel, and the outer slit and inner slit are so arranged as not to overlap or intersect each other.

In the airbag device of the invention, the insertion region of the airbag has a double wall structure of the outer panel and inner panel, and the outer slit formed on the outer panel and the inner slit formed on the inner panel are arranged so as not to overlap or intersect each other. This configuration will prevent an inflation gas which has flown into the airbag from leaking from the inner silt or outer slit, since the outer slit and its peripheral area disposed on the outer panel is covered by the inner panel whereas the inner slit and its peripheral area disposed on the inner panel is covered by the outer panel.

Therefore, the airbag device of the invention is capable of preventing a gas leakage from the airbag adequately despite the configuration that the inflator is stored inside the airbag.

In the airbag device of the invention, it is desired that the outer slit and inner slit are each formed into straight lines which are generally parallel to each other. This configuration will facilitate an inserting work of the inflator body in comparison with an instance where the outer slit and inner slit are not parallel.

It is further desired that the outer slit and inner slit are so formed as to extend generally in parallel to an axial direction of the inflator body at positions dislocated each other in a circumferential direction of the inflator body. With this configuration, when the inflator is put into the airbag, the inflator is firstly arranged along the orientation of the outer slit and inner slit, and then moved around to be put into the outer slit and inner slit. That way the inflator can be stored in the airbag with little fear that the mounting members, which protrude from the inflator body, would be engaged with peripheral areas of the outer slit and inner slit. That is, with the configuration of the airbag device of the invention, the inserting work of the inflator body into the outer slit and inner slit and a work of taking the mounting members out of the through holes can be easily conducted merely by rotating the inflator body back and forth about the center in the axial direction.

In the airbag device of the invention, moreover, it is desired that the insertion region includes a lid panel that has flexibility and covers the outer slit on outside of the outer panel, and that the lid panel is joined to the outer panel by the first end region, and is provided, in a vicinity of the second end, with one or more mounting holes each of which communicates with each of the through holes and receives the mounting member of the inflator. Covering the outer slit from the outside, such a lid panel will prevent an inflation gas which has flown into the airbag from leaking from the outer slit, thus further help prevent a gas leakage from the airbag.

In the airbag device configured as described above, it is desired that the airbag further includes an inner tube that is formed into a tube having flexibility and covers an outer circumference of the inflator body inside the airbag, and that the inner tube includes a tube body that covers the inflator body and includes one or more outlet ports for releasing the inflation gas as exited the inflator body, and a cover region that is joined to the tube body at the first end region and extends from the tube body in order to cover the inner slit from an inner side of the airbag.

When the inflator body discharges an inflation gas into the airbag, the inner tube configured as described above will deliver the gas into the airbag via the outlet ports of the tube body such that the gas may not head towards the inner slit. Further, since the second end of the cover region is a free end, the inflation gas will press the cover region against the inner surface of the inner panel to close off the inner slit, such that the gas will be prevented from leaking from the inner slit. Thus, a gas leakage from the airbag will be further adequately prevented.

In the airbag device configured as described above, it is desired that the outer slit and the inner slit are disposed on a same side with respect to the through holes, as viewed from an axial direction of the inflator body. In comparison with an instance where the outer slit and inner slit are each disposed on one side and the other with respect to the through holes, this configuration will enhance a strength of a peripheral area of the through holes in the airbag.

Furthermore, it is further desired that the inner slit is positioned closer to the through holes than the outer slit. This configuration will facilitate the inserting work of the inflator, which is composed of inserting the inflator through the outer slit, then the inner slit, and taking the mounting members of the inflator out of the through holes, in comparison with an instance where the outer slit is positioned closer to the through holes than the inner slit. That is, with the above configuration, when the inflator is put into the airbag via the outer slit, then inner slit, the mounting members are disposed near the through holes, thus can be taken out of the through holes easily.

The airbag device of the invention may be preferably provided with a guide member that is disposed between the outer panel and the inner panel for assisting with an inserting work of the inflator. The guide member is formed of a flexible sheet material, and is put through the inner slit and arranged such that the first end is disposed at a position between the outer slit and inner slit on the inner surface of the outer panel whereas the second end region is placed over the inner surface of the inner panel. The first end region of the guide member is joined to the outer panel.

When putting the inflator body into the airbag via the inner slit, such a guide member will close off a gap between the outer panel and inner panel, prevent the inflator body from going into the gap and smoothly guide the inflator body into the inner slit. That is, the guide member will facilitate an inserting work of the inflator body into the airbag.

The above airbag device having the guide member may be provided with such a lid panel that has flexibility and covers the outer slit on outside of the outer panel, and is joined to the outer panel by the first end region. The lid panel includes, in a vicinity of the second end, one or more mounting holes each of which communicates with each of the through holes of the insertion region and receives the mounting member of the inflator. Covering the outer slit from the outside, the lid panel will prevent an inflation gas which has flown into the airbag from leaking from the outer slit, thus further helps prevent a gas leakage from the airbag.

It is desired, in the airbag device configured as described above, that the outer slit and inner slit are each formed into straight lines which are generally parallel to each other. This configuration will facilitate the inserting work of the inflator body in comparison with an instance where the outer slit and inner slit are not parallel.

It is further desired in the airbag device configured as described above that the outer slit and inner slit are so formed as to extend generally in parallel to an axial direction of the inflator body at positions dislocated from the inflator body in a circumferential direction of the inflator body. With this configuration, when the inflator is put into the airbag, the inflator is firstly arranged along the orientation of the outer slit and inner slit, and then moved around to be put into the outer slit and inner slit. That way the inflator can be stored in the airbag with little fear that the mounting members, which protrude from the inflator body, would be engaged with peripheral areas of the outer slit and inner slit. That is, with the above configuration, the inserting work of the inflator body into the outer slit and inner slit and the work of taking the mounting members out of the through holes can be easily conducted merely by rotating the inflator body back and forth about the center in the axial direction.

In the airbag device configured as described above, the lid panel may be put through the outer slit such that the first end region of the lid panel is disposed on the inner surface of the outer panel.

In the airbag device configured as described above, it is also conceivable to form the airbag without a lid panel for covering the outer slit and form the through holes between the outer slit and inner slit. With this configuration, when the airbag is mounted on a vehicle body structure, the region of the airbag between the outer slit and inner slit will be held down by the inflator body, thus a gas leakage will be adequately prevented even though the airbag does not include a lid panel.

Nevertheless, the outer slit and the inner slit may be disposed on a same side with respect to the through holes, as viewed from an axial direction of the inflator body. In comparison with an instance where the outer slit and inner slit are each disposed on one side and the other with respect to the through holes, this configuration will enhance a strength of a peripheral area of the through holes in the airbag.

BRIEF DESCRIPTION OF DRAWINGS

FIG. 29 is a partial enlarged bottom view of an insertion region of a further modification of the airbag of the invention.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
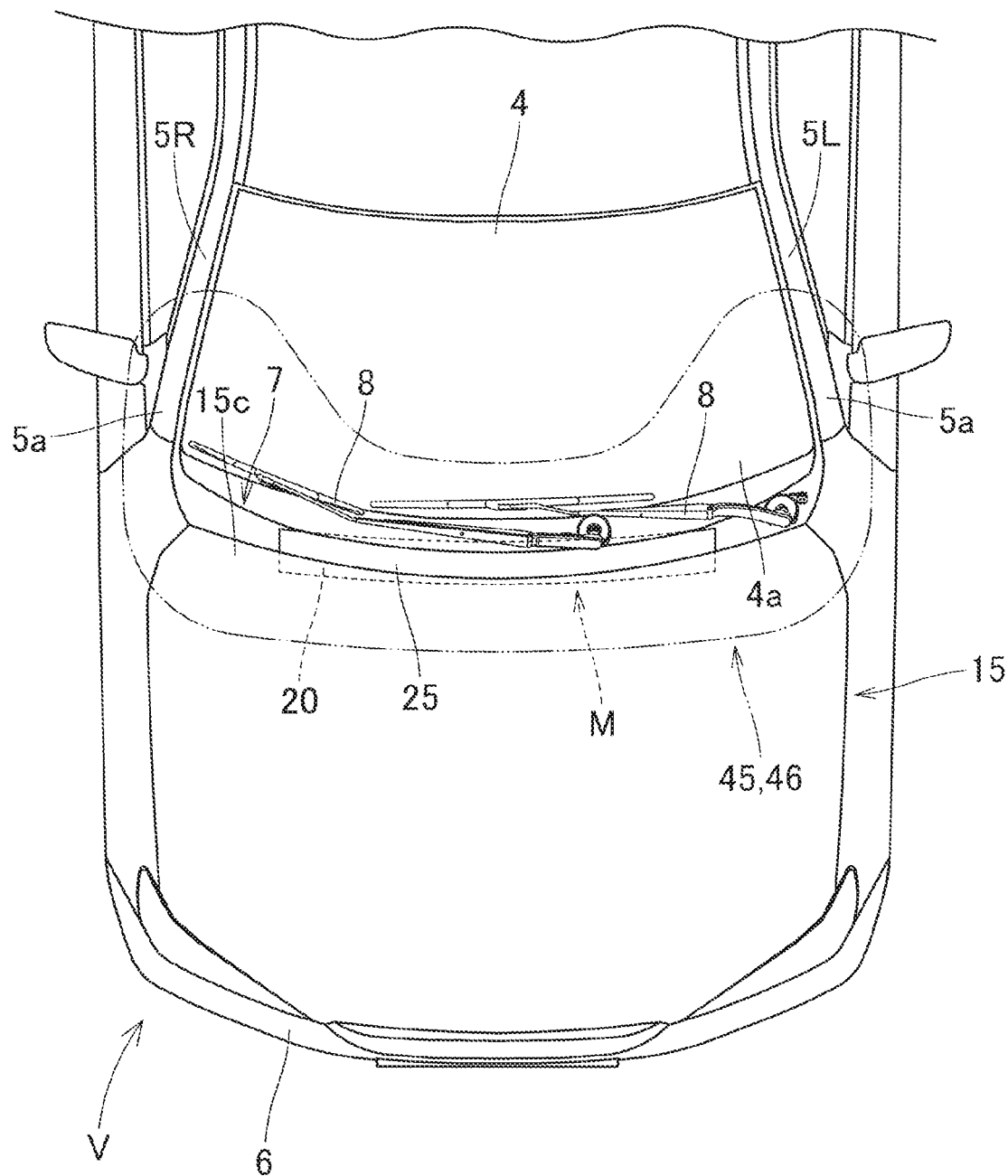
FIG. 1 is a plan view of a vehicle equipped with an airbag device for pedestrian protection embodying the invention.
Figure 2:
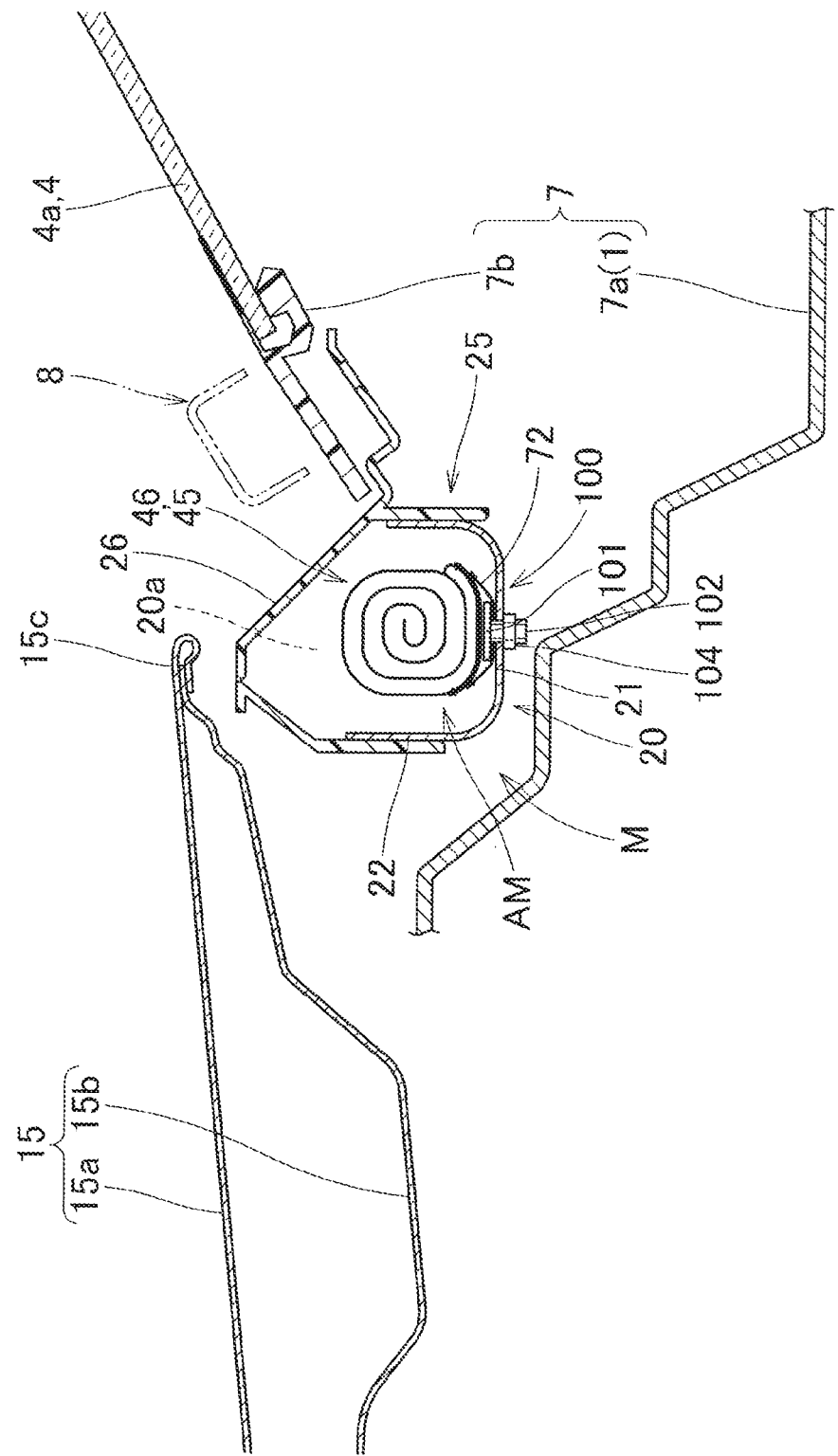
FIG. 2 is a schematic vertical sectional view of the airbag device of FIG. 1 taken along a front and rear direction.
Figure 3:
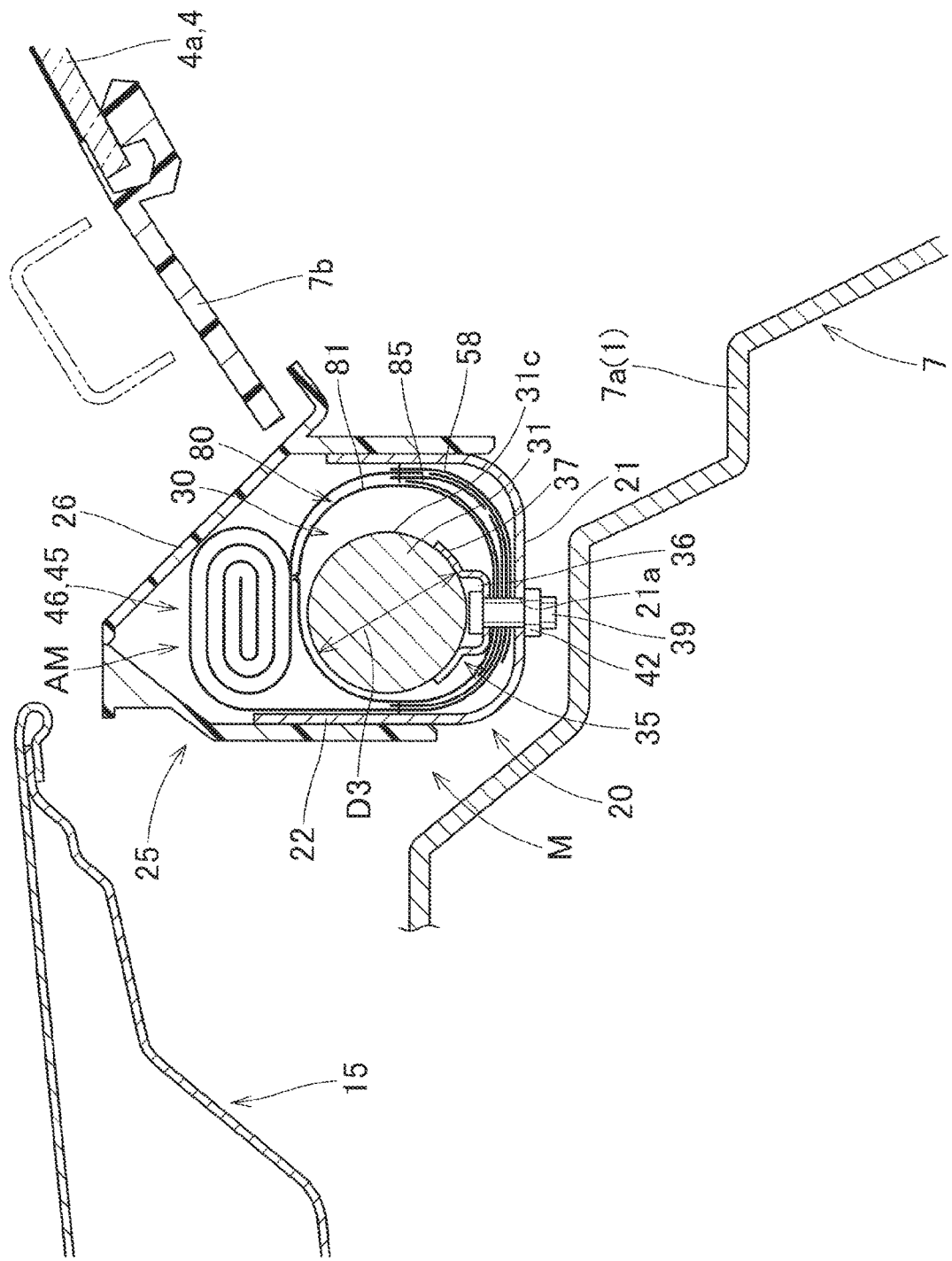
FIG. 3 is a schematic enlarged vertical sectional view of the airbag device of FIG. 1 taken along the front and rear direction, especially showing an inflator.

In the following description, the invention will be described as embodied into an airbag device M for pedestrian protection. The airbag device M is disposed in a vicinity of a rear end 15c of a hood 15 of a vehicle V, as shown in FIGS. 1 to 3. More particularly, the airbag device M is disposed proximate to and at the rear of the rear end 15c of the hood 15, generally at the center in a left and right direction of the vehicle V between left and right front pillars 5L and 5R. Unless otherwise specified, front/rear, up/down and left/right directions in this description are intended to refer to front/rear, up/down and left/right directions of the vehicle V.

The vehicle V is provided, inside the front bumper 6 (FIG. 1), with a not-shown sensor for detecting an impact against a pedestrian. The vehicle V is also provided with a not-shown actuating circuit which is connected with the sensor. The actuating circuit actuates an inflator 30 of the airbag device M in response to a signal fed from the sensor that has detected an impact against a pedestrian.

As shown in FIG. 1, the hood 15 covers an engine room of the vehicle V and is joined to the body structure 1 of the vehicle V with not-shown hinge sections in such a manner as to be openable forward. The hinge sections are located at the left and right edges of the rear end 15c region of the hood 15. The hood 15 of the illustrated embodiment is fabricated of a steel plate, a plate material of aluminum (aluminum alloy) or the like, and is composed of an outer panel 15a, which forms a top face, and an inner panel 15b, which forms a lower face and has a higher strength than the outer panel 15a, as shown in FIGS. 2 and 3. As shown in FIG. 1, in order to fit a later-described front windshield 4, the rear end 15c region of the hood 15 is so shaped as to curve with respect to a left and right direction such that the center in a left and right direction is disposed forward whereas left and right end regions are disposed rearward.

As shown in FIGS. 2 and 3, there is disposed a cowl 7 at the rear of the hood 15. The cowl 7 is composed of a cowl panel 7a which has high rigidity and belongs to the vehicle body structure 1, and a cowl louver 7b which is disposed above the cowl panel 7a and is fabricated of synthetic resin. The cowl louver 7b is continuous with a lower region 4a of the front windshield 4 at the rear end. The cowl 7 is also shaped along the curvature of the rear end 15c of the hood 15 to curve relative to the left and right direction such that the central region in a left and right direction is disposed forward whereas the left and right end regions are disposed rearward (FIG. 1). As shown in FIG. 1, a pair of wipers 8 are disposed on the cowl 7. As indicated with double-dotted lines in FIGS. 2 and 3, the wipers 8 are so disposed as to protrude upward from the cowl louver 7b. The front pillars 5L and 5R are disposed on the left and right of the front windshield 4.

Figure 4:
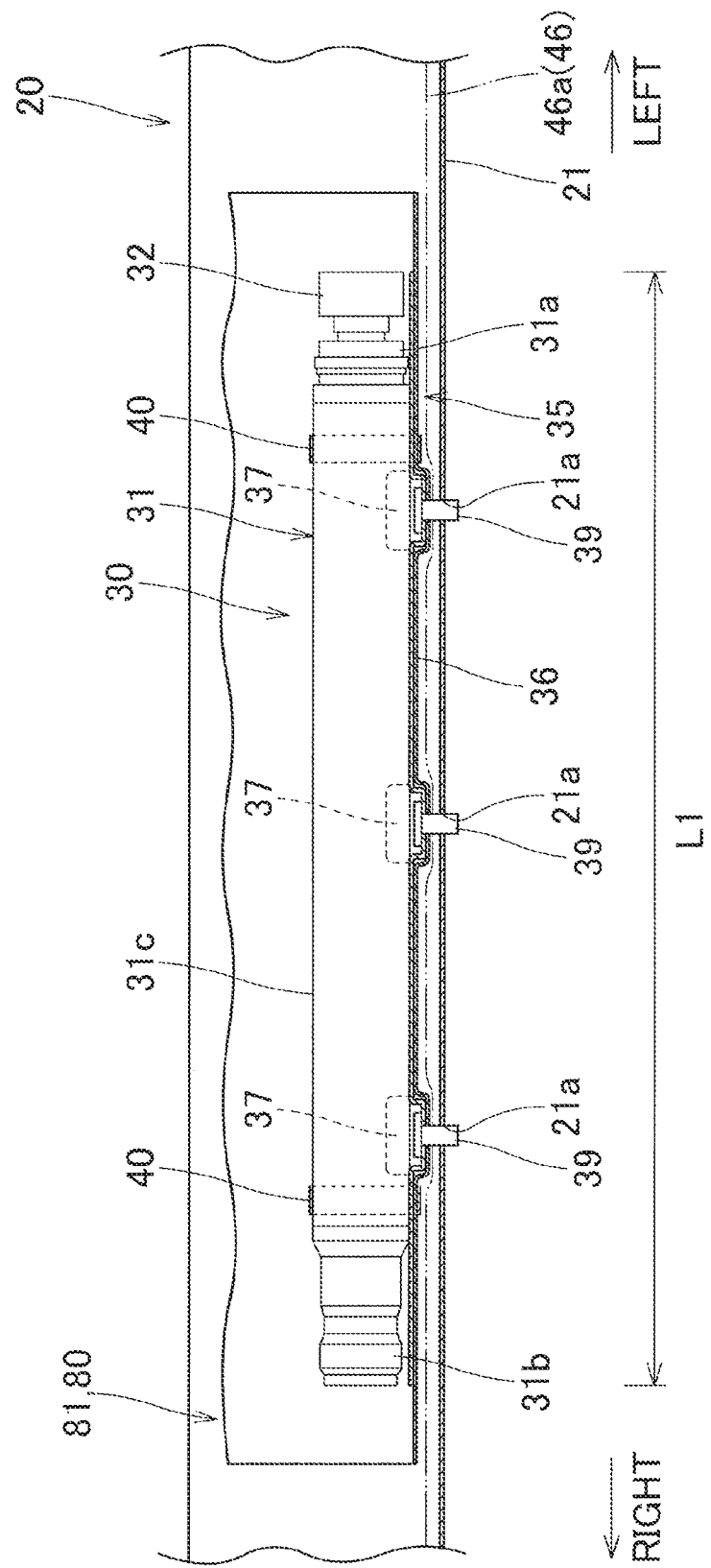
FIG. 4 is a schematic vertical sectional view of the airbag device of FIG. 1 taken along a left and right direction, especially showing the inflator.

Referring to FIGS. 2 to 4, the airbag device M includes an airbag 45, an inflator 30 that feeds an inflation gas to the airbag 45, a case 20 that houses the airbag 45 and inflator 30, an airbag cover 25 for covering the airbag 45, and a mounting bracket 100 that mounts later-described mounting tongues 72 (72L, 72R) of the airbag 45 on the case 20.

As shown in FIGS. 2 and 3, the case 20 is formed of a sheet metal into an open-topped box shape. The case 20 is formed of a sheet metal, and includes a bottom wall 21, a circumferential wall 22 which rises from the circumferential edge of the bottom wall 21 in a generally square tubular shape, and an emergence opening 20a which is disposed at the top of the circumferential wall 22 for allowing airbag emergence. The bottom wall 21 is provided with a plurality of mounting holes 21a for receiving later-described mounting bolts 39 for mounting the inflator 30 and later-described mounting bolts 102 for mounting the mounting tongues 72 of the airbag 45, as shown in FIGS. 2 to 4, 17, 18 and 22. In the airbag device M of the illustrated embodiment, the bottom wall 21 of the case 20 serves as a member of the vehicle body structure 1 on which the inflator 30 is mounted. The case 20 is mounted on the cowl panel 7a through the use of not-shown mounting brackets such that a front region of the case 20 is disposed immediately beneath the rear end 15c of the hood 15 and a rear region of the case 20 is disposed at the rear of the hood 15. The case 20 is also shaped along the curvature of the rear end 15c of the hood 15 to curve relative to the left and right direction such that the central region in a left and right direction is disposed forward whereas the left and right end regions are disposed rearward (FIG. 1).

The airbag cover 25 is formed from soft synthetic resin such as thermoplastic elastomer of polyolefin (TPO). As shown in FIGS. 2, 3, 22 and 23, the airbag cover 25 covers the emergence opening 20a of the case 20, and includes a door section 26 which is openable for allowing airbag emergence when pushed by the airbag 45. The airbag cover 25 is fixed to the case 20 at predetermined portions with not-shown mounting means.

The inflator 30 includes a body 31 and a mounting bracket 35 used to mount the body 31 to the case 20.

Figure 5:
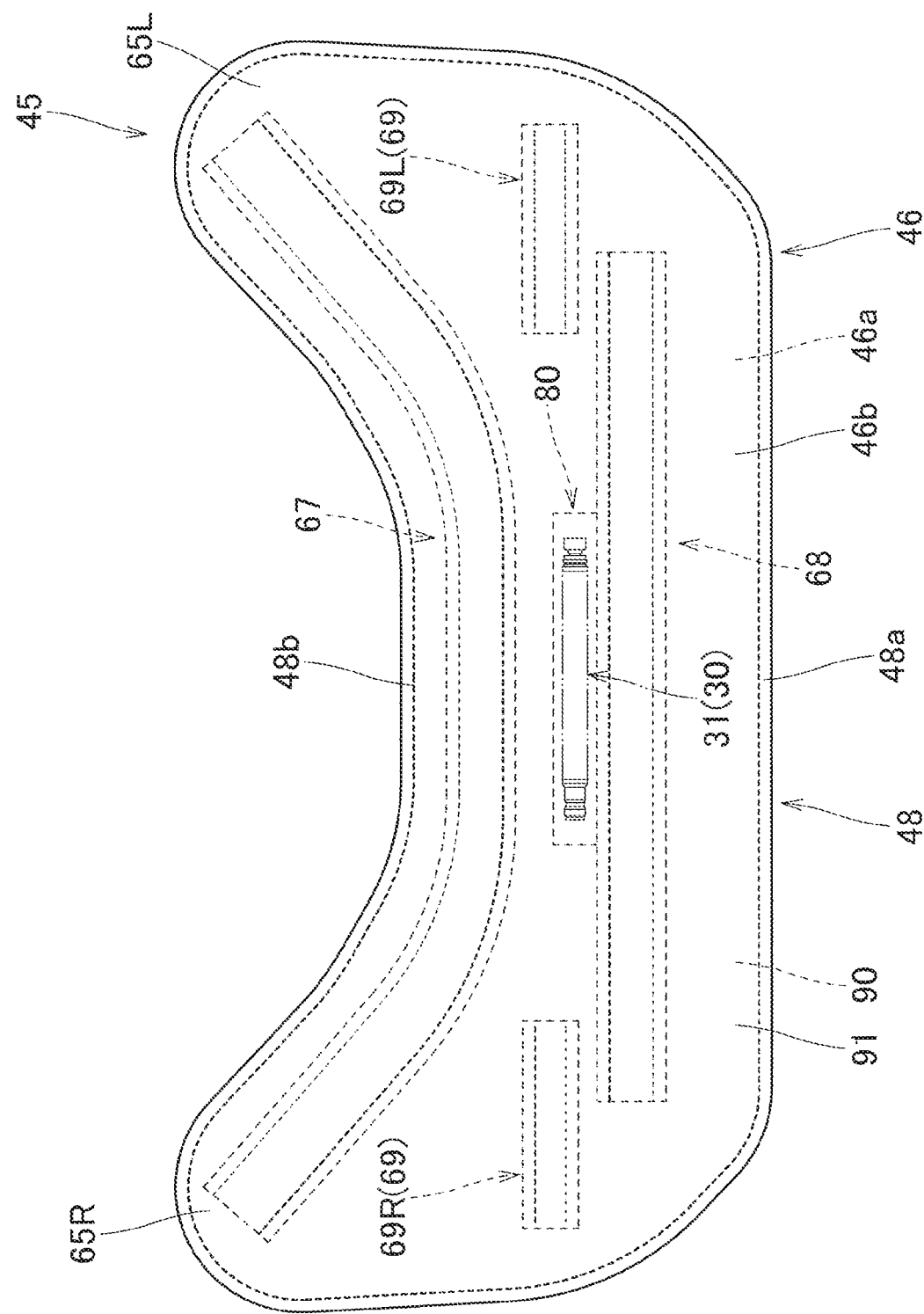
FIG. 5 is a plan view of an airbag for use in the airbag device of the embodiment as laid flat.

As shown in FIGS. 3 and 4, the inflator body 31 is formed generally into a cylinder, and placed inside a later-described airbag body 46 of the airbag 46. More specifically, as indicated with double-dotted lines in FIGS. 5 and 6, the inflator body 31 is arranged to extend along a left and right direction at a generally center in a front and rear direction and in a left and right direction of a later-described transverse inflatable portion 48 of the airbag 45, inside the airbag 45. The inflator body 31 includes a gas releasing region 32 at the first end in the axial direction (or leading end, or left end, in the illustrated embodiment) 31a. The gas releasing section 32 is provided with numerous gas releasing ports which discharge an inflation gas. The second end (or root end, or right end, in the illustrated embodiment) 31b of the inflator 30 is electrically connected to the actuating circuit through a not-shown lead wire.

Referring to FIGS. 3 and 4, the mounting bracket 35 includes a supporting section 36 which supports an underside of the inflator body 31 and a plurality of (three, in the illustrated embodiment) mounting bolts 39 which protrude downwardly from the supporting section 36. The supporting section 36 is formed of a sheet metal into a band extending generally along a left and right direction (or along an axial direction of the inflator body 31). The supporting section 36 is provided, at more than one (three, in the illustrated embodiment) positions in the left and right direction, with a plurality of pairs of support tongues 37 which support the inflator 30. In each of the pairs, the support tongues 37 extend diagonally upward and outwardly in a front and rear direction from the front and rear edges of the supporting section 36 so as to support an outer circumference 31c of the inflator body 31. The front and rear support tongues 37 are symmetrical in the front and rear direction, as shown in FIG. 3. The three pairs of the supporting tongues 37 are disposed at the same location as the mounting bolts 39. The mounting bolts 39 are disposed at three positions; at a vicinity of each of left and right ends of the supporting section 36, and at a generally center in a left and right direction of the supporting section 36. The mounting bracket 35 and inflator body 31 are coupled together with the aid of a plurality of (two, in the illustrated embodiment) clamps 40 (FIG. 4), which are mounted around the mounting bracket 35 and inflator body 31 at a vicinity of each of left and right ends of the inflator body 31.

Figure 7:
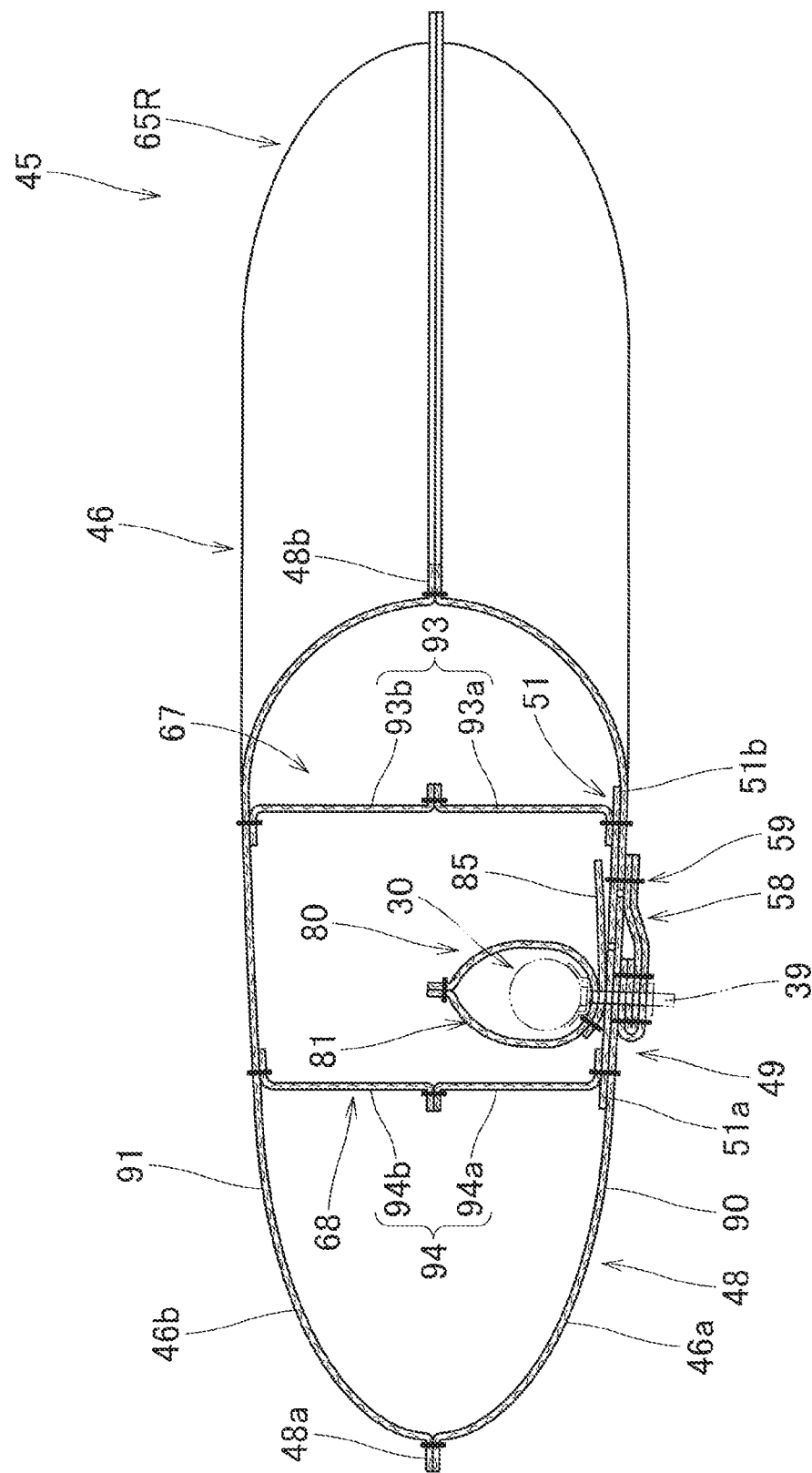
FIG. 7 is a sectional view of the airbag of FIG. 5 as inflated by itself, taken along line VII-VII of FIG. 6.

That is, the inflator 30 of the illustrated embodiment is an assembled structure of the inflator body 31 and mounting bracket 35. As shown in FIGS. 3 and 4, the mounting bolts (i.e. mounting member) 39 protrude from the outer circumference 31c of the inflator body 31 generally orthogonally to the axis of the inflator body 31 (i.e. downwardly). The inflator 30 is stored inside the airbag 45 such that the mounting bolts 39 protrude from later-described insert holes 55 of the airbag 45 and later-described mounting holes 62 of a lid panel 58, as indicated with double-dotted lines in FIG. 7. In other words, the inflator body 31 and the supporting section 36 of the mounting bracket 35 are stored inside the airbag 45. In that state, the inflator 30 is mounted on the bottom wall 21 of the case 20 (i.e. on a part of the vehicle body structure), together with the airbag 45. More particularly, the inflator 30 and airbag 45 are mounted on the bottom wall 21 of the case 20 by nut 42 fastening of the mounting bolts 39 which protrude from the bottom wall 21 of the case 20 via the mounting holes 62 of the lid panel 58, as shown in FIG. 3. Further, in the illustrated embodiment, the inflator 30, i.e. the assembled structure of the inflator body 31 and mounting bracket 35, are covered with a tube body 81 of a later-described inner tube 80 inside the airbag 45, as best shown in FIG. 7.

Referring to FIGS. 5 to 8, the airbag 45 includes a bag body 46 which is inflatable with an inflation gas, a mounting tongue 72 by which the bag body 46 is mounted on the case 20, and an inner tube 80 which covers an outer circumference of the inflator 30 inside the bag body 46. As described later, the bag body 46 includes an insertion region 49 via which the inflator 30 is inserted into the bag body 46.

The bag body 46 is designed to be inflated into a generally U shape elongated in a left and right direction, as viewed from the front. The bag body 46 as deployed includes a transverse inflatable portion 48 that extends generally along the left and right direction, along the lower region 4a of the front windshield 4, and a pair of vertical inflatable portions 65L and 65R that extend rearward from opposite ends of the transverse inflatable portion 48 and cover the lower regions 5a of the front pillars 5L and 5R. The bag body 46 includes a pedestrian-side wall 46b deployable on the upper side and a vehicle-side wall 46a deployable on the lower side and opposed to the pedestrian-side wall 46b. The bag body 46 is formed by joining (sewing) outer circumferential edges of the pedestrian-side wall 46b and vehicle-side wall 46a together.

Figure 6:
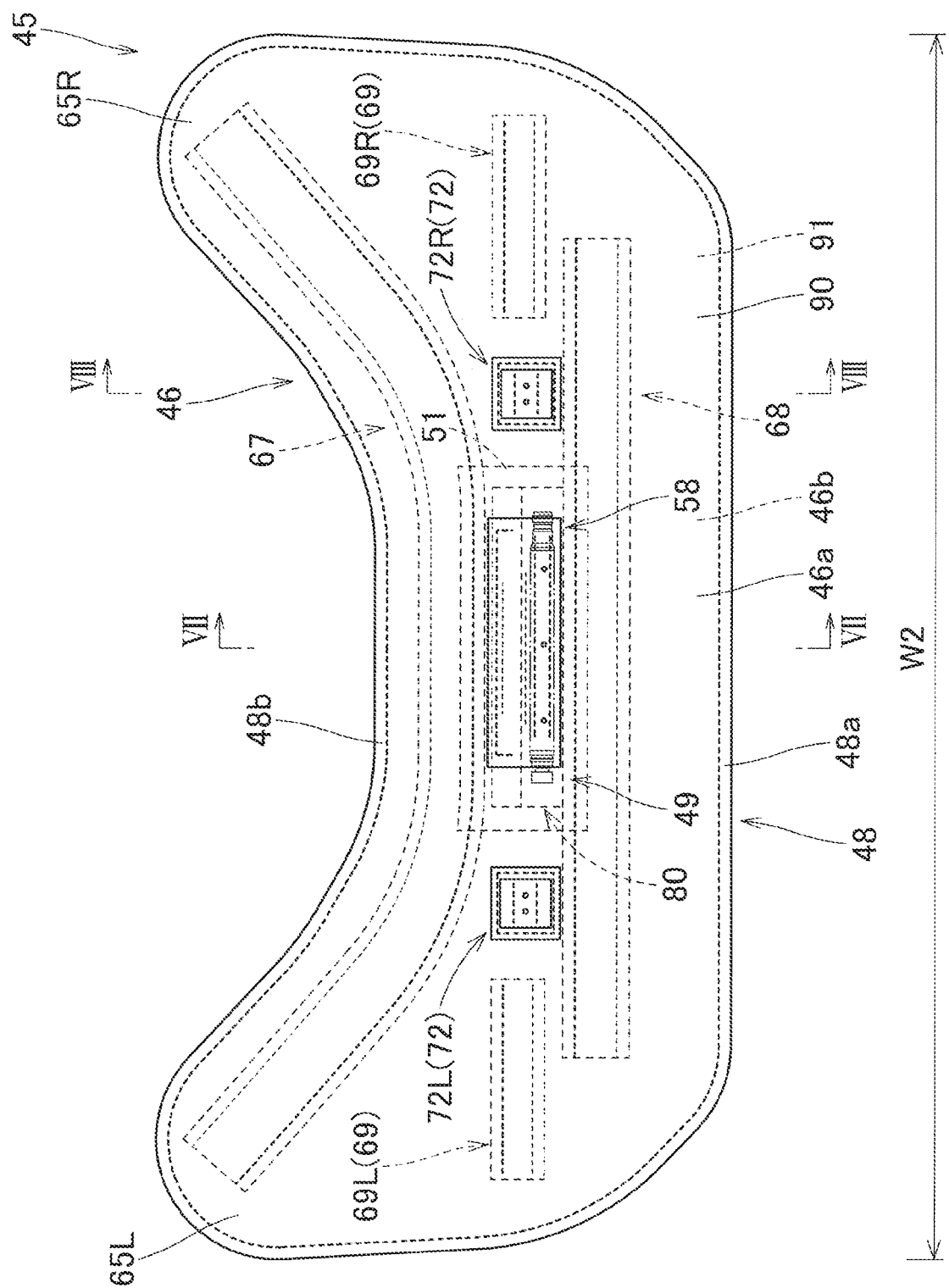
FIG. 6 is a bottom view of the airbag of FIG. 5.
Figure 21:
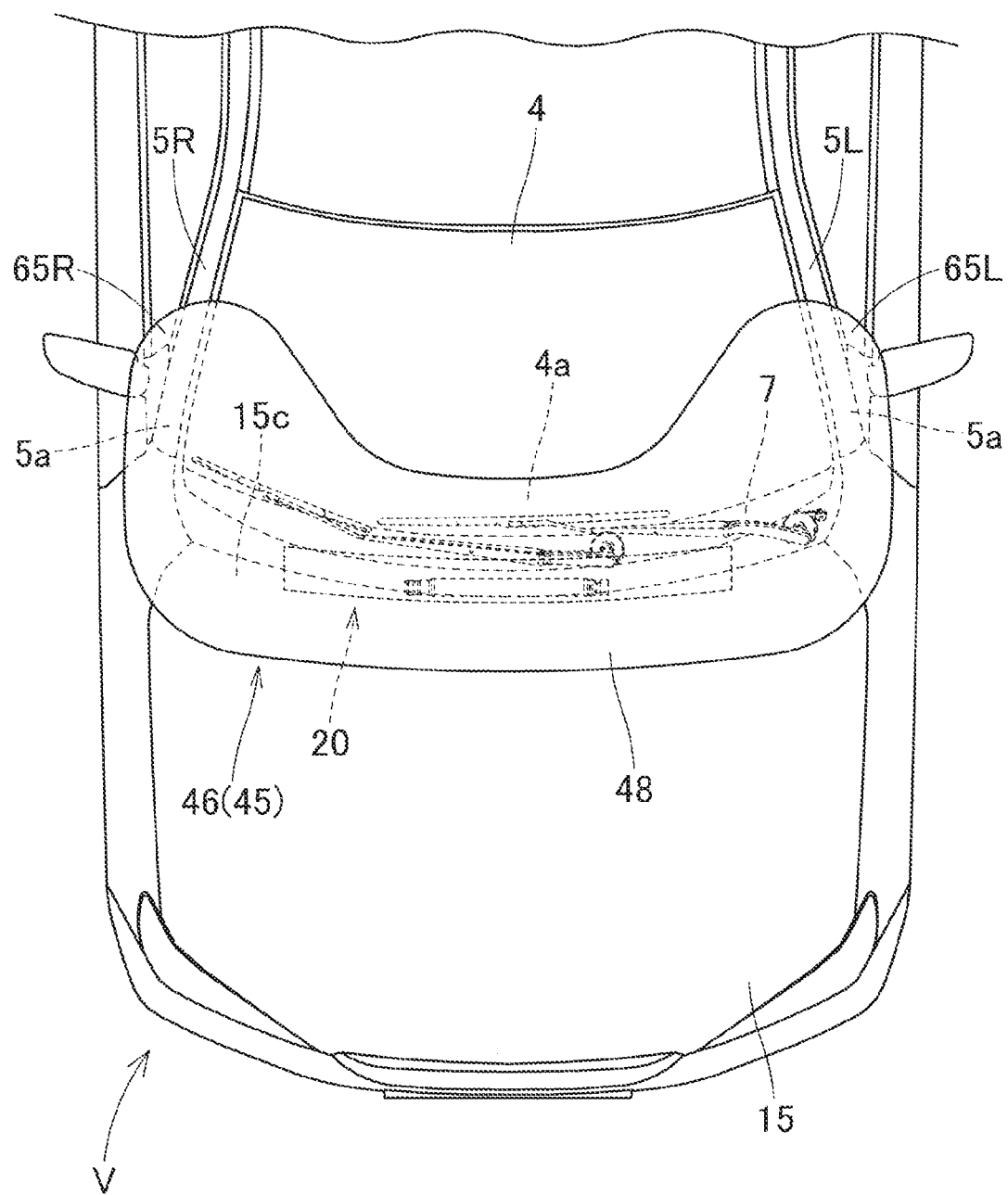
FIG. 21 is a schematic plan view of the airbag device of the embodiment as has completed airbag deployment.
Figure 22:
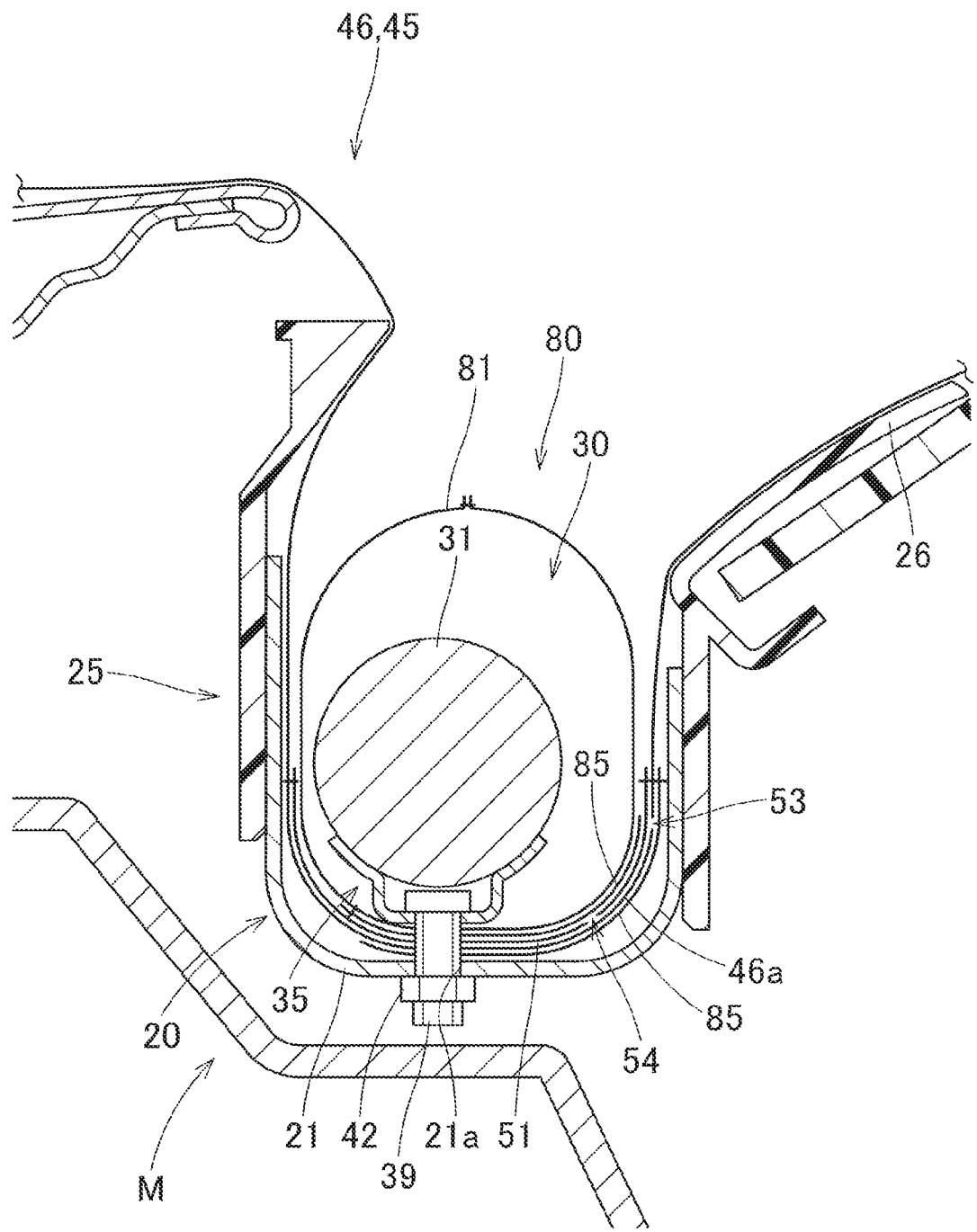
FIG. 22 is a schematic partial enlarged vertical sectional view of the airbag device as has completed airbag deployment, especially showing the inflator and its vicinity.
Figure 23:
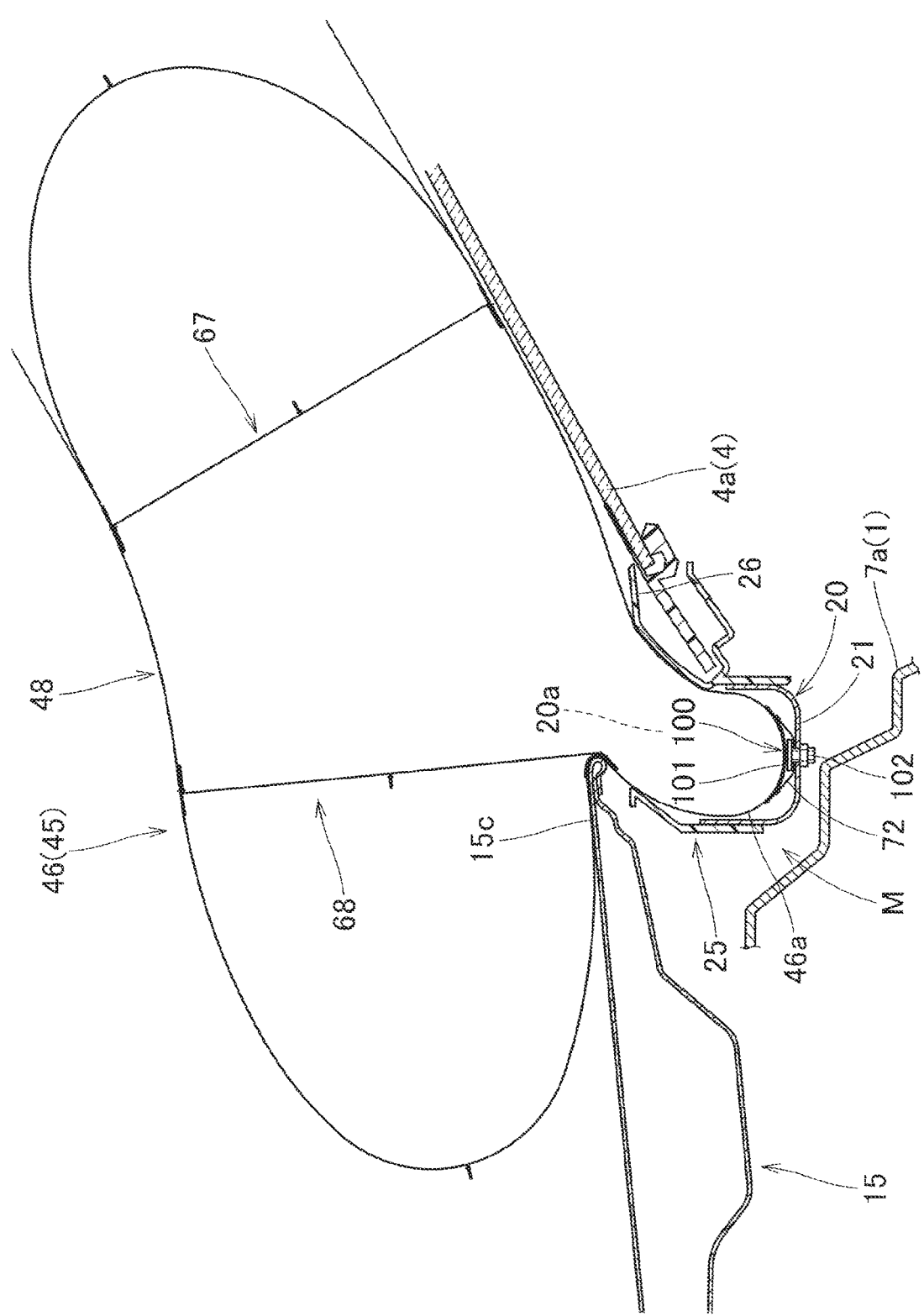
FIG. 23 is a schematic vertical sectional view of the airbag device as has completed airbag deployment, taken at the location of the mounting tongue.

The transverse inflatable portion 48 is designed to be deployed over the rear end 15c region of the hood 15, the cowl 7 and the lower region 4a of the front windshield 4 including the wipers 8, as shown in FIGS. 21 and 23. As described above, the inflator 30 is to be stored in a central area in the front and rear direction and in the left and right direction of the transverse inflatable portion 48, and a generally central area in the front and rear direction and in the left and right direction of the vehicle-side wall 46a in the transverse inflatable portion 48 serves as an insertion region 49, via which the inflator 30 is inserted into the airbag 45 (FIG. 6).

Figure 9:
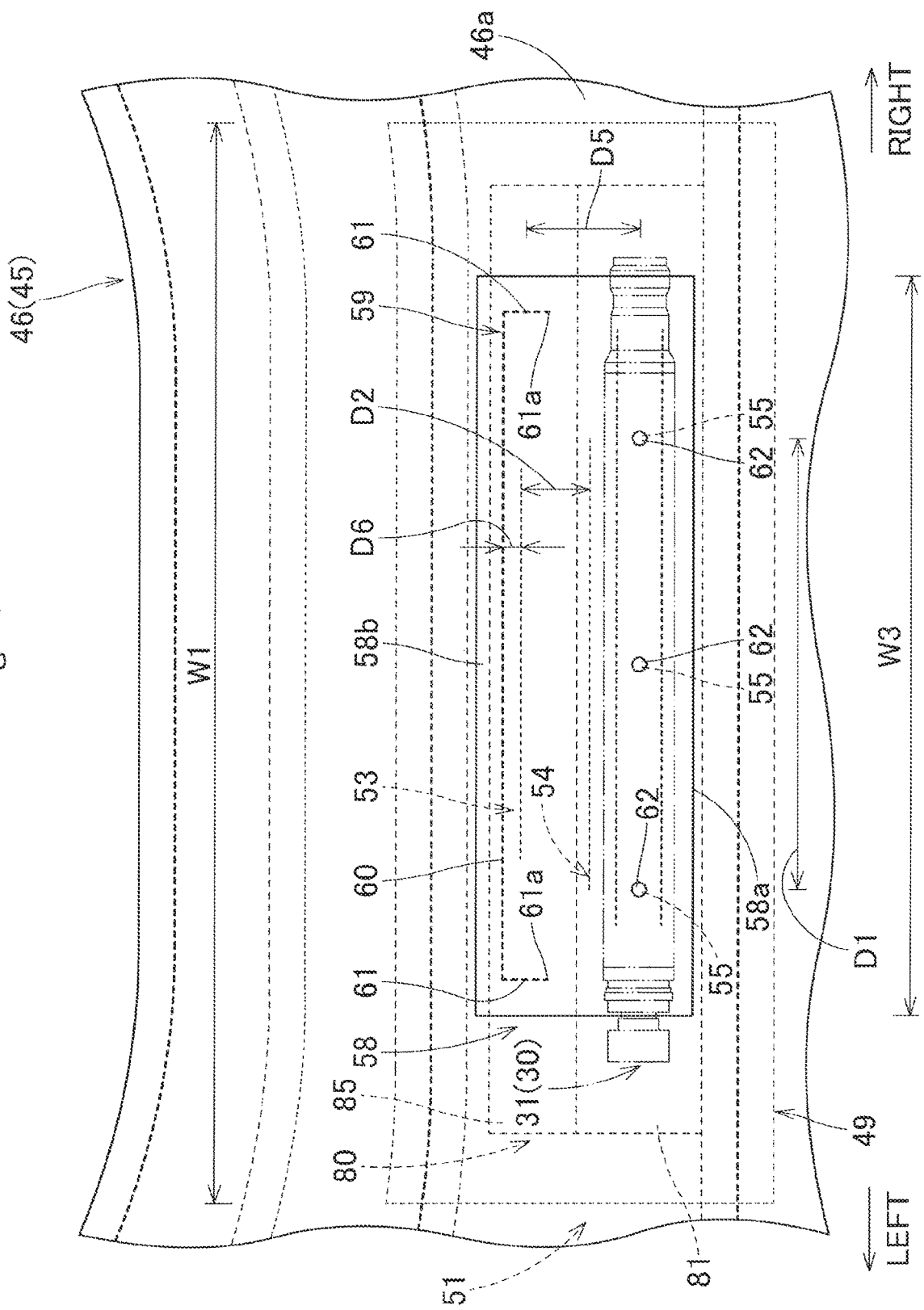
FIG. 9 is a partial enlarged bottom view of an insertion region of the airbag of FIG. 5.
Figure 10:
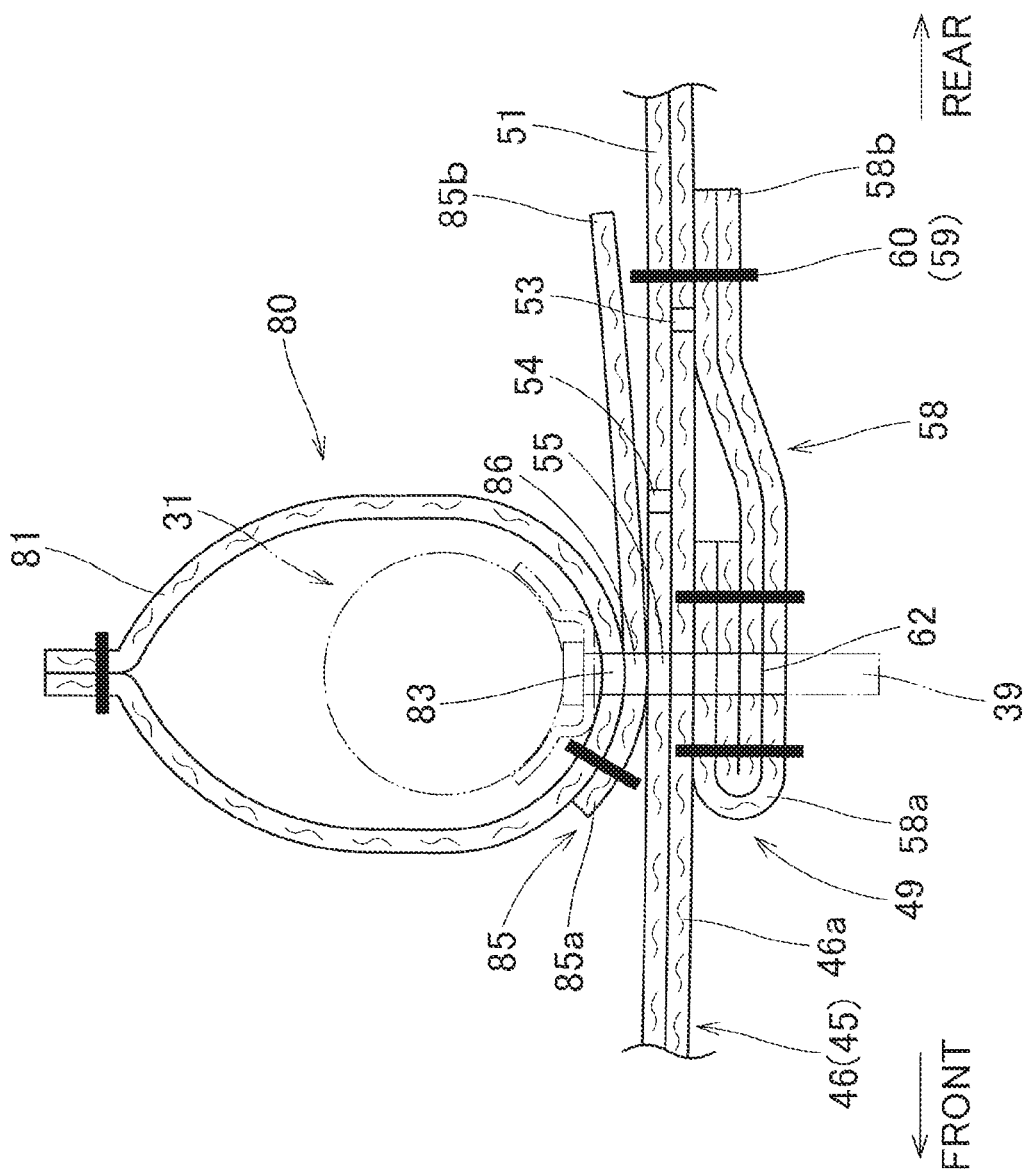
FIG. 10 is a partial enlarged sectional view of the airbag of FIG. 5 showing the insertion region and an inner tube.

More specifically, the insertion region 49 is disposed between a front center tether 68 and a rear center tether 67 and between side tethers 69L and 69R as described later, i.e. generally in the central area in the front and rear direction and in the left and right direction of the vehicle-side wall 46a. The insertion region 49 is reinforced by a reinforcing panel 51 on the inner side. That is, the insertion region 49 has a double wall structure of the vehicle-side wall (outer panel) 46a and the reinforcing panel (inner panel) 51, as shown in FIGS. 9 and 10. The reinforcing panel 51 serving as the inner panel has a rectangular shape large enough to cover the insertion region 49 all over. The front edge 51a and rear edge 51b of the reinforcing panel 51 are joined (sewn) to the vehicle-side wall 46a together with the front center tether 68 and rear center tether 67, as shown in FIG. 7. The width W1 (FIG. 9) in a left and right direction of the reinforcing panel 51 is greater than the length L1 (FIG. 4) of the inflator body 31 and the width W4 (FIG. 12) in a left and right direction of the tube body 81 of the inner tube 80, and is approximately one third of the width W2 (FIG. 6) in the left and right direction of the bag body 46 as laid flat.

Figure 11:
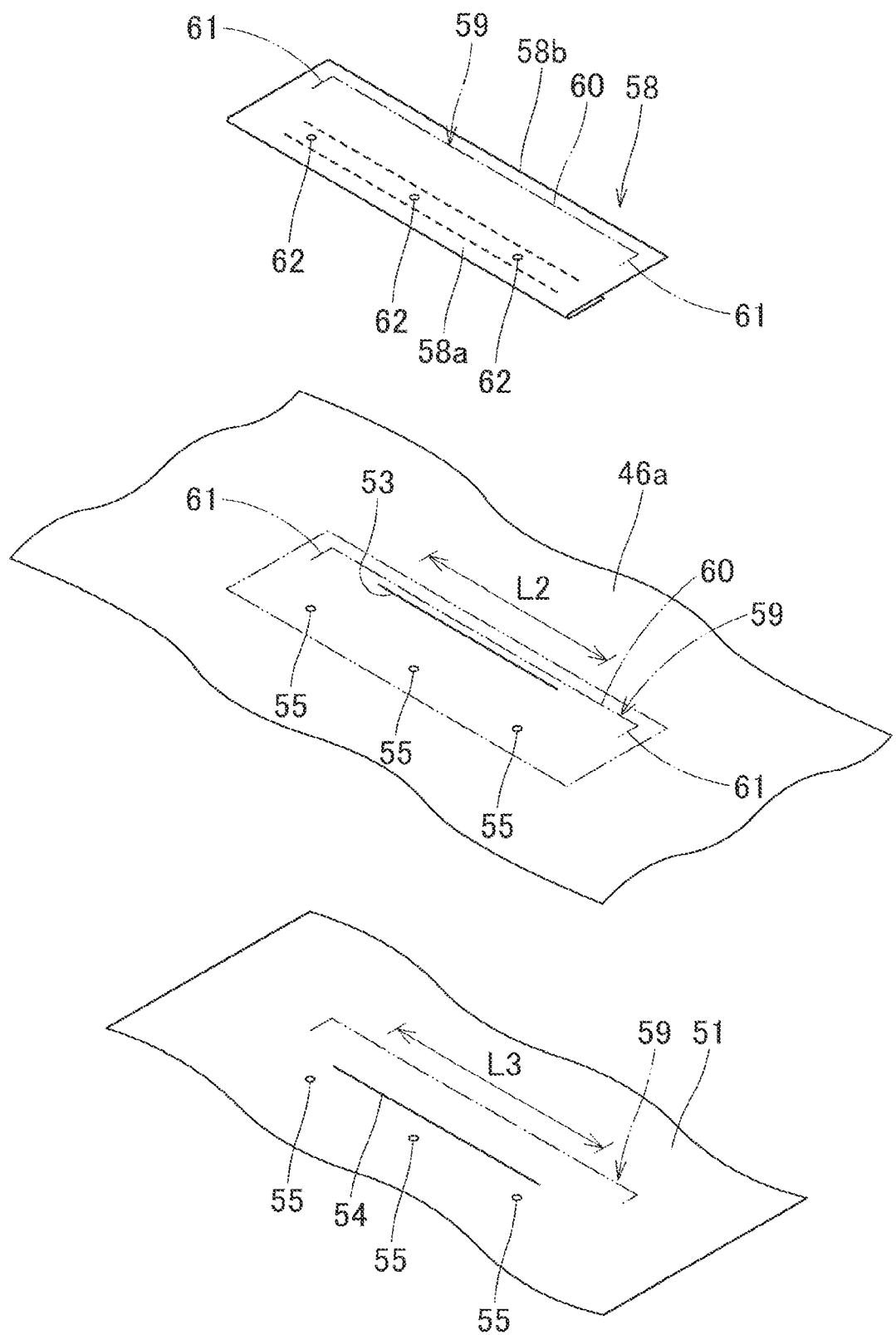
FIG. 11 is a schematic exploded perspective view of the insertion region.

Referring to FIGS. 9 to 11, the insertion region 49 includes an outer slit 53 which is formed on the vehicle-side wall (i.e. outer panel) 46a, an inner slit 54 which is formed on the reinforcing panel (i.e. inner panel) 51, three through holes 55 which are formed through the vehicle-side wall 46a and reinforcing panel 51, and a lid panel 58 which is disposed on outside of the vehicle-side wall 46a.

The outer slit 53 and inner slit 54 constitute an inlet of the inflator 30 (or inflator body 31) in combination. As shown in FIG. 9, in the illustrated embodiment, each of the outer slit 53 and inner slit 54 is formed into a straight line extending along the axial direction of the inflator body 31, i.e. generally along a left and right direction. In the bag body 46 as laid flat, the outer slit 53 and inner slit 54 are dislocated from each other in a front and rear direction (in other words, in a circumferential direction of the inflator body 31 as mounted on board) and arranged in a non-intersecting fashion. In the illustrated embodiment, the outer slit 53 and inner slit 54 are generally in parallel. More specifically, the inner slit 54 formed on the reinforcing panel 51 is disposed farther to the front than the outer slit 53. The outer slit 53 and inner slit 54 have different length. Specifically, the length L2 of the outer slit 53 is slightly smaller than the length L3 of the inner slit 54, as shown in FIGS. 9 and 11. The length L2 of the outer slit 53 is smaller than the length of a joint 59 which joins (sews) a rear end 58b region of the lid panel 58 to the vehicle-side wall 46a. The length L3 of the inner slit 54 is generally identical to a distance D1 (FIG. 9) between a leftmost through hole 55 and a rightmost through hole 55. The length L3 of the inner slit 54 is smaller than the length L1 of the inflator body 31 and smaller than the width W3 in a left and right direction of the lid panel 58. More particularly, the length L3 is approximately four sevenths of the length L1 of the inflator body 31, and the length L2 of the outer slit 53 is approximately a half of the length L1 of the inflator body 31. The lengths L2 and L3 of the outer slit 53 and inner slit 54 are determined to be as small as possible to such an extent that enables a smooth entry of the inflator 30 (i.e. the assembled structure of the inflator body 31 and mounting bracket 35). The inner slit 54 is slightly greater in length than the outer slit 53 in consideration of easiness of insertion of the inflator 30 after having passed through the outer slit 53. In the illustrated embodiment, when the inflator 30 is placed inside the bag body 46 with the mounting bolts 39 protruding from the through holes 55, the outer slit 53 and inner slit 54 are disposed at the rear of the inflator body 31, within a range of the width of the inflator body 31 in the left and right direction, as shown in FIGS. 9 and 10. The distance D2 (FIG. 9) between the outer slit 53 and inner slit 54 as the bag body 46 is laid flat is generally identical to the outer diameter D3 (FIG. 3) of the inflator body 31.

Each of the through holes 55 is formed through the reinforcing panel 51 and vehicle-side wall 46a at three positions in the left and right direction for receiving the mounting bolt 39 of the inflator 30. The through holes 55 are disposed in a front area of the inner slit 54 in the bag body 46 as laid flat, as shown in FIG. 9. That is, in the illustrated embodiment, the inner slit 54 is positioned closer to the through holes 55 than the outer slit 53. Further, the outer slit 53 and inner slit 54 are disposed at the rear of the through holes 55 in the bag body 46 as laid flat. In other words, both of the outer slit 53 and inner slit 54 are disposed on the same side with respect to the through holes 55 as viewed from the axial direction of the inflator body 31 (i.e. at the rear of the through holes 55), as shown in FIG. 10.

The lid panel 58 is formed of a flexible sheet material. As shown in FIG. 9, the lid panel 58 is disposed on outside of the vehicle-side wall 46a and cover the outer slit 53. The lid panel 58 is formed into a rectangle elongated in the left and right direction. The width W3 (FIG. 9) in the left and right direction of the lid panel 58 is greater than the length L2 of the outer slit 53 and smaller than the length L1 of the inflator body 31. The width W3 is greater than the length L3 of the inner slit 54 and is approximately double of the length L2 of the outer slit 53. Moreover, the width W3 is approximately seven tenths of the width W1 in the left and right direction of the reinforcing panel 51. The width in the front and rear direction of the lid panel 58 is smaller than that of the reinforcing panel 51. The lid panel 58 is joined (sewn) to the vehicle-side wall 46a and reinforcing panel 51 by the rear end 58b region (i.e. by the first end region). More specifically, the rear end 58b region of the lid panel 58 is joined to the vehicle-side wall 46a and reinforcing panel 51 generally all over with a joint 59 (FIG. 9) at a position at the rear of and proximate to the outer slit 53 (i.e. at a position between the outer slit 53 and rear central tether 67).

As shown in FIG. 9, the joint 59, which joins (sews) the rear end 58b region of the lid panel 58 to the vehicle-side wall 46a and reinforcing panel 51, includes a main body 60 which extends straightly and continuously along the left and right direction (generally in parallel to the outer slit 53), and a pair of terminal regions 61 which extend forward from left and right ends of the main body 60. The main body 60 is greater in length than the outer slit 53 such that the left and right ends are disposed farther to the left and right than the outer slit 53. Each of the terminal regions 61 is formed into a generally straight line extending in the front and rear direction, and is disposed farther to the left/right than the outer slit 53. The leading ends 61a of the terminal regions 61 are disposed farther to the front than the outer slit 53, as shown in FIG. 9. That is, the outer slit 53 is surrounded by the joint 59 on the three sides, except on the front side. The clearance D6 (FIG. 9) between the main body 60 of the joint 59 and outer slit 53 in the bag body 46 as laid flat is such as to permit a smooth insertion of the inflator 30. The lid panel 58 is provided, in a vicinity of the front or second end 58a, with three mounting holes 62 each of which communicates with each of the through holes 55 and receives the mounting bolt 39 of the inflator 30. That is, the lid panel 58 is disposed to cover the location of the inner slit 54 and outer slit 53 entirely in the bag body 46 as laid flat. In the illustrated embodiment, the lid panel 58 is composed of two base cloths 92 shown in FIG. 20, and formed by laying the base cloths 92 over each other and doubling the front region. That is, the area of the lid panel 58 where the mounting holes 62 are disposed has a quadruple wall structure, as shown in FIG. 10.

Figure 8:
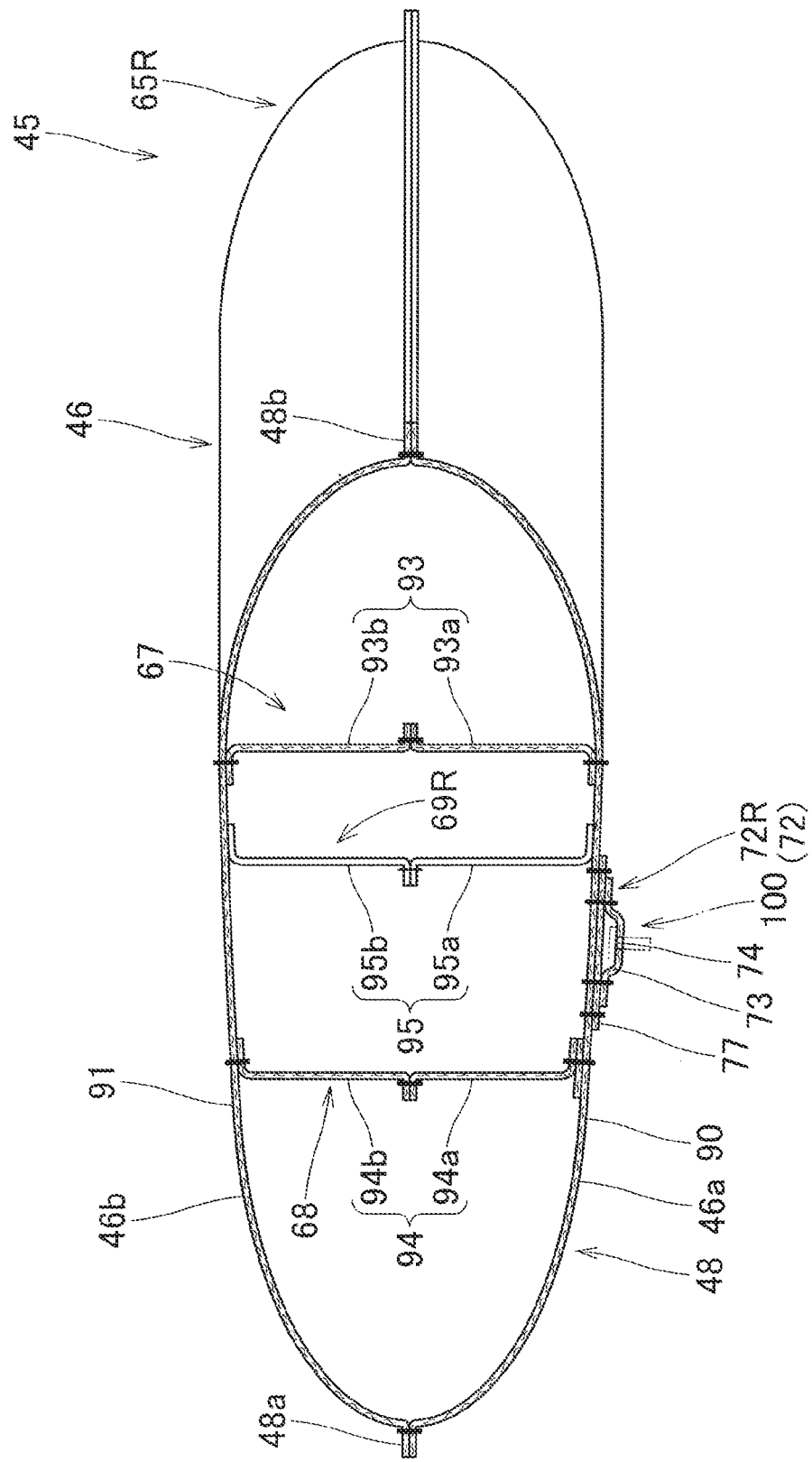
FIG. 8 is a sectional view of the airbag of FIG. 5 as inflated by itself, taken along line VIII-VIII of FIG. 6.
Figure 19:
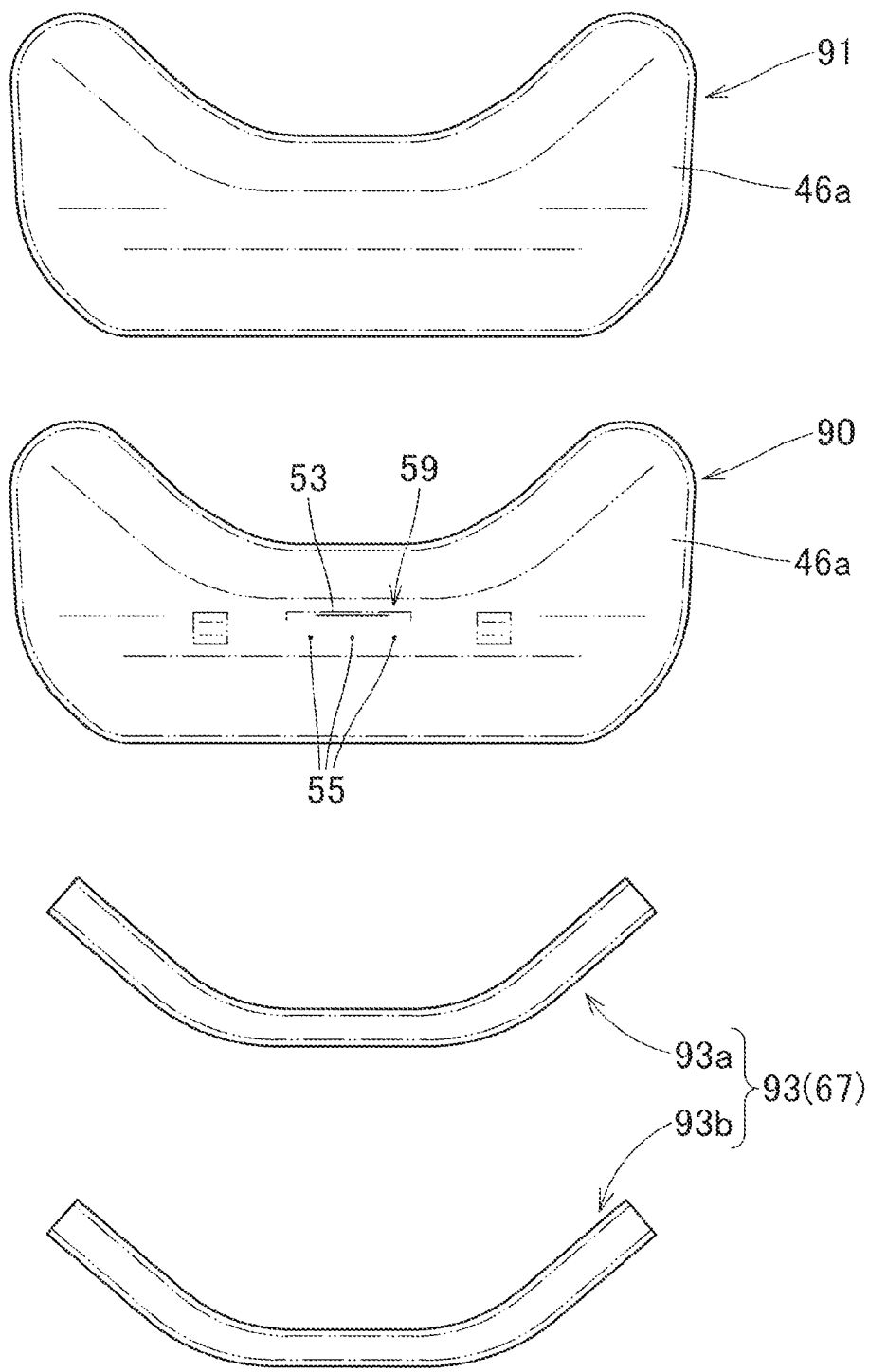
FIGS. 19 and 20 depict base cloths of the airbag of FIG. 5 in plan views.
Figure 20:
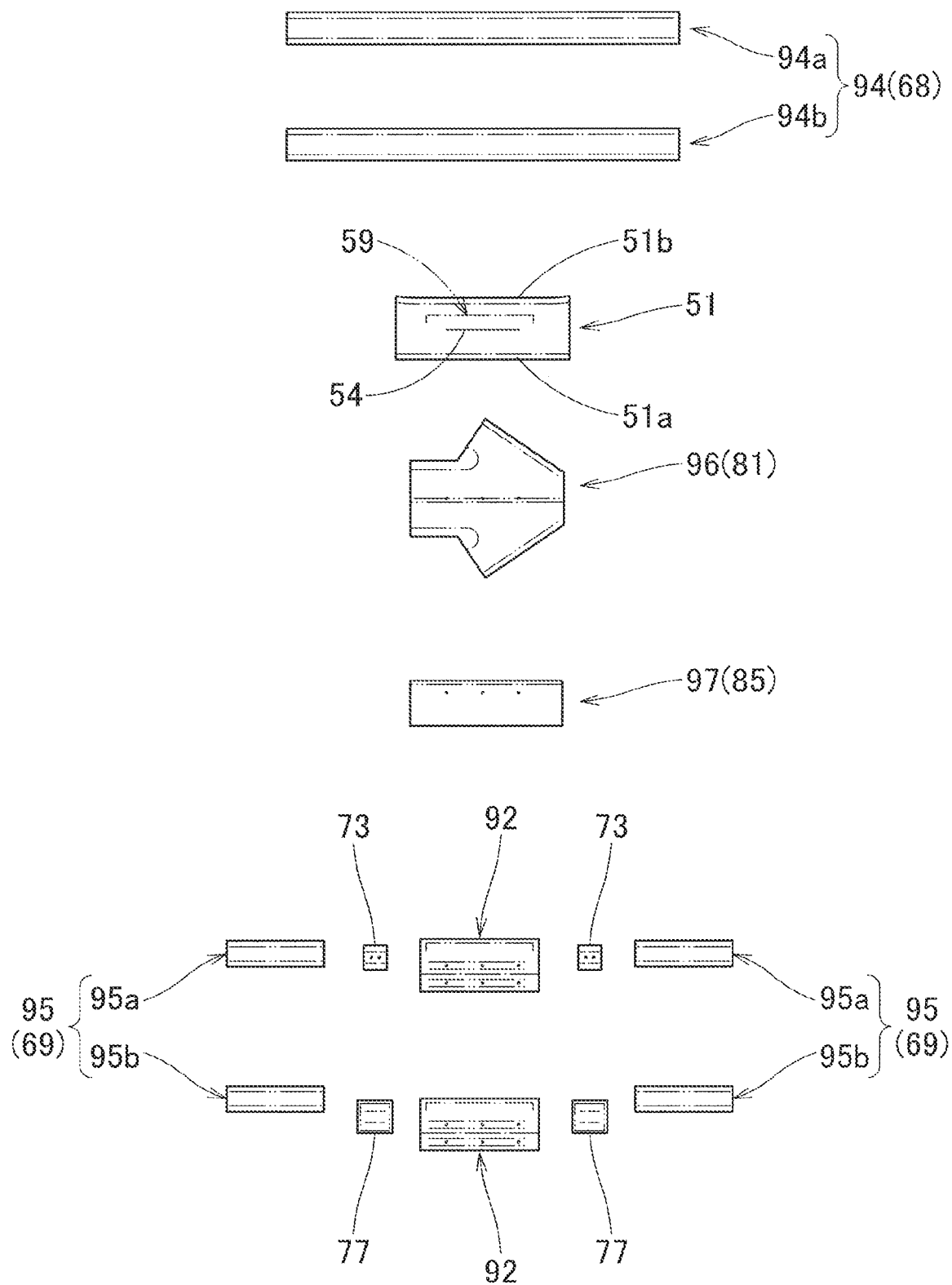

Referring to FIGS. 5 to 8, the bag body 46 internally includes a rear center tether 67, a front center tether 68 and a pair of side tethers 69 (69L and 69R) each of which connects the pedestrian-side wall 46b and vehicle-side wall 46a and limits a clearance between the pedestrian-side wall 46b and vehicle-side wall 46a at airbag deployment. The rear center tether 67 is disposed across the transverse inflatable portion 48 and left and right vertical inflatable portions 65L and 65R. The rear center tether 67 is arranged in such a manner as to curve gently generally along the rear edge of the bag body 46 as laid flat, at the rear of the center in a front and rear direction of the transverse inflatable portion 48. As shown in FIGS. 7, 8 and 19, the rear center tether 67 is composed of two pieces of base cloths 93, i.e. a vehicle-side member 93a disposed towards the vehicle-side wall 46a and a pedestrian-side member 93b disposed towards the pedestrian-side wall 46b. The front center tether 68 is arranged generally straightly generally along the front edge of the bag body 46 as laid flat (i.e. along the left and right direction), in front of the center in a front and rear direction of the transverse inflatable portion 48 (i.e. in a front region of the insertion region 49). As shown in FIGS. 7, 8 and 20, the front center tether 68 is composed of two pieces of base cloths 94, i.e. a vehicle-side member 94a disposed towards the vehicle-side wall 46a and a pedestrian-side member 94b disposed towards the pedestrian-side wall 46b. The side tethers 69 (69L and 69R) are disposed in an area between the rear center tether 67 and front center tether 68 (on the left and right sides of the insertion region 49), in front of the vertical inflatable portions 65L and 65R. The side tethers 69L and 69R are each formed into a generally straight line extending along the left and right direction, and are generally symmetrical to each other. As shown in FIGS. 8 and 20, each of the side tethers 69L and 69R is also composed of two pieces of base cloths 95, i.e. a vehicle-side member 95a disposed towards the vehicle-side wall 46a and a pedestrian-side member 95b disposed towards the pedestrian-side wall 46b.

Figure 17:
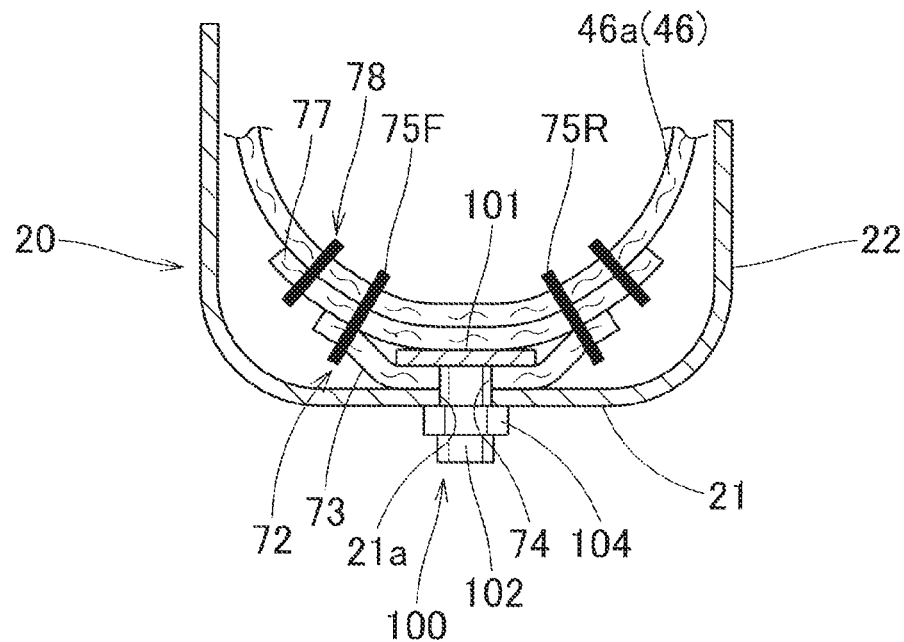
FIG. 17 is a vertical sectional view of the mounting tongue as mounted on a case, taken along a front and rear direction.
Figure 18:
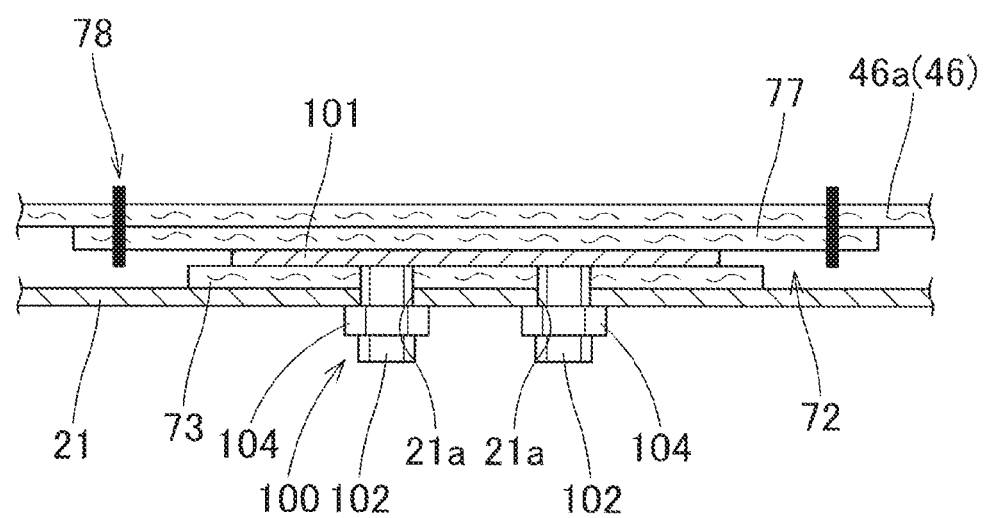
FIG. 18 is a vertical sectional view of the mounting tongue as mounted on the case, taken along a left and right direction.

The mounting tongues 72 (72L and 72R), by which the bag body 46 is mounted on the case 20, are prepared separate from the bag body 46 and joined to the vehicle-side wall 46a of the bag body 46, as shown in FIGS. 6 and 14 to 16. The mounting tongues 72 are formed of a flexible sheet material. As shown in FIGS. 17 and 18, the mounting tongues 72 are mounted on the bottom wall 21 of the case 20 each with the aid of a mounting bracket 100 as described later. As shown in FIG. 6, the airbag 45 of the illustrated embodiment includes two mounting tongues 72 (72L and 72R), which are disposed at generally symmetrical positions between the insertion region 49 and side tethers 69L and 69R in the bag body 46 as laid flat. Further, the mounting tongues 72 are disposed generally at the center in a front and rear direction of an area between the front center tether 68 and rear center tether 67.

Figure 14:
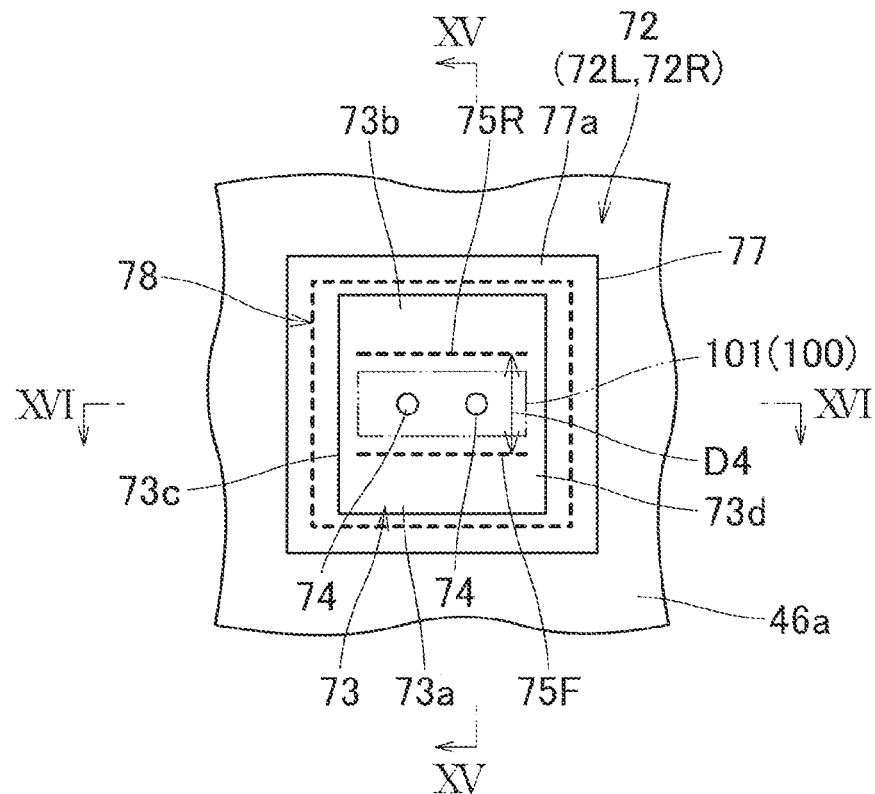
FIG. 14 is a partial enlarged bottom view of the airbag of FIG. 5 showing a mounting tongue.
Figure 15:
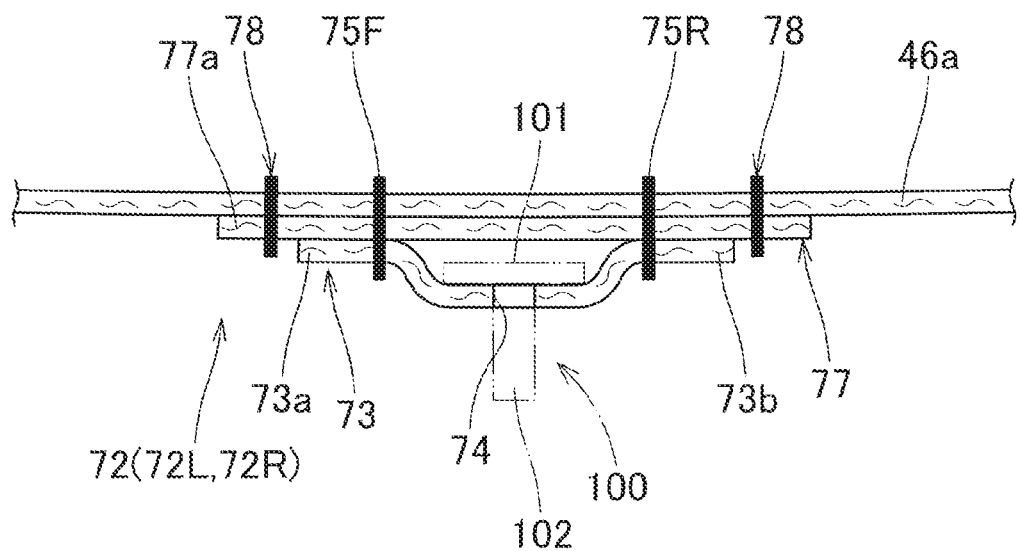
FIG. 15 is a sectional view taken along line XV-XV of FIG. 14.
Figure 16:
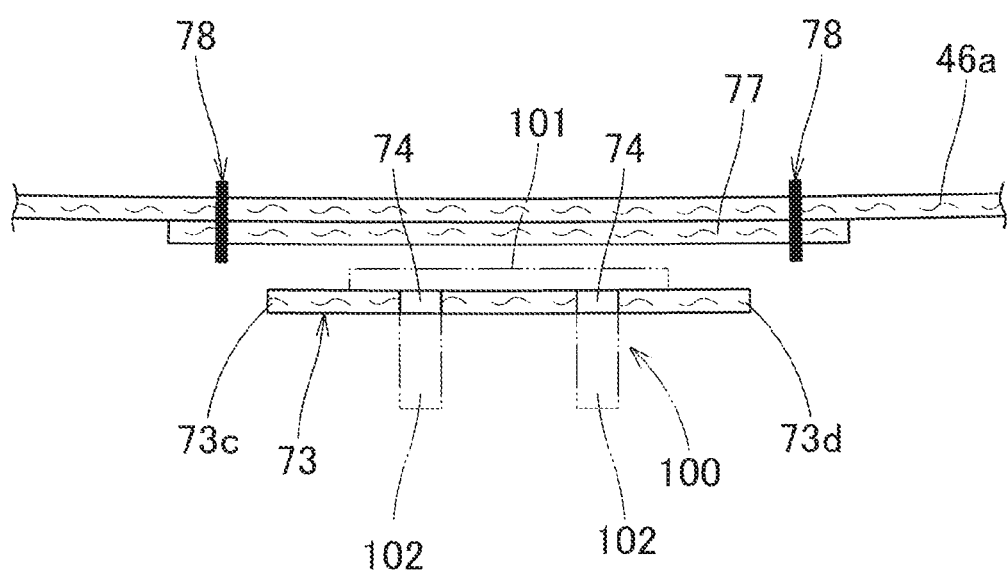
FIG. 16 is a sectional view taken along line XVI-XVI of FIG. 14.

Referring to FIGS. 14 to 16, each of the mounting tongues 72 includes a mounting body 73 and a reinforcing section 77 disposed between the mounting body 73 and vehicle-side wall 46a. The mounting body 73 of the illustrated embodiment is formed into a generally rectangle a little elongated in the front and rear direction. The mounting body 73 includes two through holes 74 for receiving later-described mounting bolts 102 of the mounting bracket 100. The through holes 74 are disposed side by side in the left and right direction, generally at the center in the front and rear direction. The reinforcing section 77 is greater than the mounting body 73, and is formed into a rectangle a little elongated in the left and right direction. The reinforcing section 77 is joined (sewn) to the vehicle-side wall 46 by a joint 78 that is formed along an outer circumferential edge of the reinforcing section 77. The joint 78 is formed continuously over an entire outer circumferential edge of the reinforcing section 77, at an outside of the mounting body 73. The mounting body 73 is joined (sewn) to the vehicle-side wall 46a by two joints 75F and 75R which are each formed in a vicinity of the front edge 73a and in a vicinity of the rear edge 73b (i.e. in front of and at the rear of the through holes 74). The joints 75F and 75R are disposed at farther inward positions than the joint 78 of the reinforcing section 77, and join the reinforcing section 77 together to the vehicle-side wall 46a. Each of the joints 75F and 75R is formed into a straight line extending over a generally entire area in the left and right direction of the mounting body 73. As indicated with double-dotted lines in FIGS. 15 and 16, a mounting bracket 100 is attached to each of the mounting tongues 72 via a left edge 73c or right edge 73d, which is not joined to the vehicle-side wall 46a, such that a mounting plate 101 of the mounting bracket 100 is disposed between the reinforcing section 77 and mounting body 73 and the mounting bolts 102 protrude from the through holes 74. The clearance D4 (FIG. 14) between the joints 75F and 75R is so determined as to permit a smooth insertion of the mounting plate 101 and the mounting bolts 102, and to keep the mounting bolts 102 protruded from the through holes 74.

The inner tube 80 is formed of a flexible sheet material, and includes a tube body 81 which covers the inflator 30 (more specifically, the inflator body 31 and the supporting section 36 of the mounting bracket 35), and a cover region 85 which extends from the tube body 81.

Figure 12:
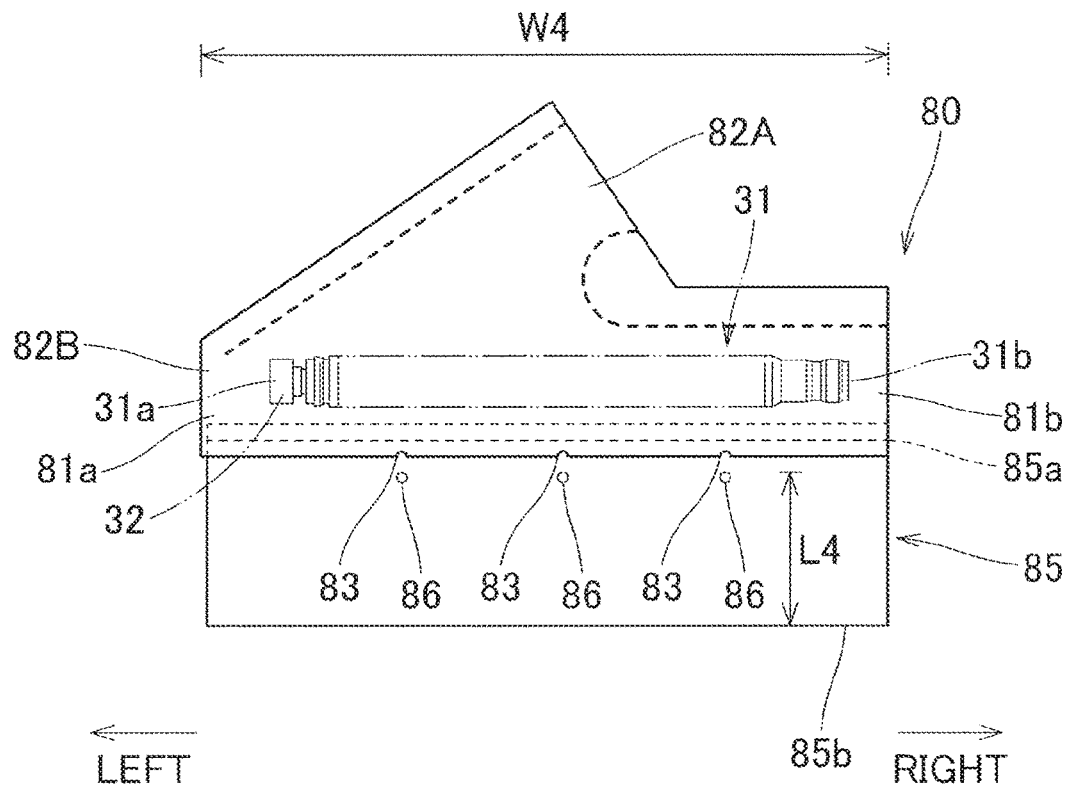
FIG. 12 is a bottom view of the inner tube as laid flat.

As shown in FIG. 12, the tube body 81 of the illustrated embodiment is a tube open at the right end 81b and left end 81a, and the right end 81b region of the tube body 81 as laid flat serves as a root region from which the inflator 30 is inserted into the tube body 81, and the left end 81a region serves as the leading end region which is provided with two outlet ports 82A and 82B. The left end (i.e. leading end) 81a region is bifurcate into an outlet port 82A which releases an inflation gas as exited the inflator body 31 obliquely upward towards the right and an outlet port 82B which releases the inflation gas towards the left. The tube body 81 is further provided with three through holes 83 for receiving the mounting bolts 39 of the mounting bracket 35 as holds the inflator body 31. The through holes 83 are arranged along the left and right direction. The tube body 81 is so sized to cover the inflator body 31 entirely, and the width W4 (FIG. 12) in the left and right direction of the tube body 81 as laid flat is greater than the length L1 of the inflator body 31. The width W4 is greater than the width W3 in the left and right direction of the lid panel 58 of the insertion region 49 as the bag body 46 is laid flat, such that the tube body 81 as stored inside the bag body 46 extends farther towards the left and right than the lid panel 58, as shown in FIG. 9. The tube body 81 is formed by folding a base cloth 96 shown in FIG. 20 into two and joining (sewing) the mated outer circumferential edges together.

Figure 13:
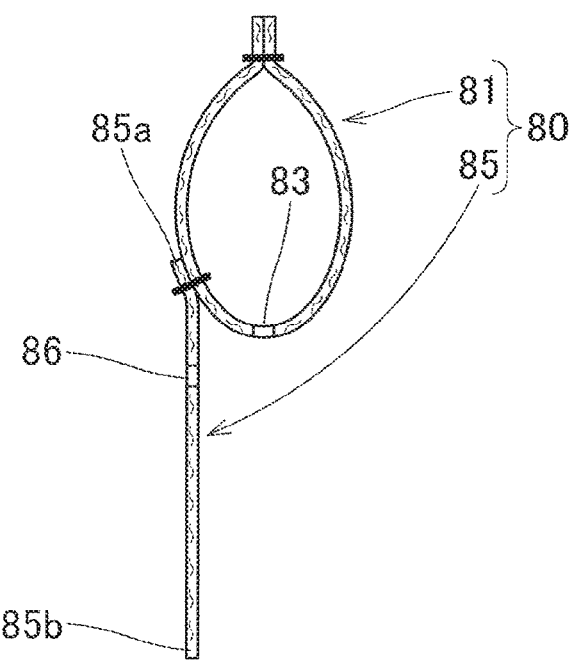
FIG. 13 is a vertical sectional view of the inner tube of FIG. 12.

The cover region 85 extends rearward from the tube body 81 as shown in FIG. 10, with the first end (root end) 85a region joined (sewn) to a region of the tube body 81 in front of and in a vicinity of the through holes 83, leaving the second end (leading end) 85b unjoined, as a free end. At positions in a vicinity of the root end 85a and corresponding to the through holes 83 of the tube body 81, there are formed three through holes 86 for receiving the mounting bolts 39 of the mounting bracket 35, as shown in FIGS. 12 and 13. The length L4 of the cover region 85 (i.e. a distance between one of the through holes 86 and leading end 85b, FIG. 12) is greater than a distance D5 (FIG. 9) between one of the through holes 55 and the outer slit 53 in the bag body 46 as laid flat, such that the cover region 85 extends rearward beyond the inner slit 54, and further extends beyond the outer slit 53, on the reinforcing panel 51, as shown in FIG. 10. That is, in the illustrated embodiment, the leading end 85b of the cover region 85 is disposed at the rear of not only the inner slit 54 but also the outer slit 53. The width in the left and right direction of the cover region 85 is generally identical to that of the tube body 81. In other words, the width is greater than the width W3 in the left and right direction of the lid panel 58, and greater than the length L3 of the inner slit 54. That is, the cover region 85 covers the inner slit 54 formed in the reinforcing panel 51 entirely from the inside.

As shown in FIGS. 19 and 20, the airbag 45 is composed of a vehicle-side base cloth 90 for forming the vehicle-side wall 46a, a pedestrian-side base cloth 91 for forming the pedestrian-side wall 46b, two base cloths 93 for forming the rear center tether 67, two base cloths 94 for forming the front center tether 68, four base cloths 95 for forming the side tethers 69, a base cloth 96 for forming the tube body 81 of the inner tube 80, a base cloth 97 for forming the cover region 85 of the inner tube 80, the reinforcing panel 51 and two sets of the mounting body 73 and reinforcing section 77 for forming the mounting tongues 72, and two base cloths 92 for forming the lid panel 58. Each of these base cloths is fabricated of a woven fabric of polyamide yarn, polyester yarn or the like, and provided in a predetermined cut shape. Each of the base cloths is coated with a suitable coating agent for preventing gas leakage.

The mounting bracket 100, which is used to mount the mounting tongue 72 on the bottom wall 21 of the case 20, includes a mounting plate 101 and two mounting bolts 102 protruding downwardly from the mounting plate 101. The mounting plate 101 is a generally rectangular plate elongated in a left and right direction as indicated with double-dotted lines in FIG. 14. The underside of the mounting plate 101 is covered with the mounting body 73 of the mounting tongue 72 generally entirely when attached to the mounting tongue 72. The mounting bolts 102 are arranged along the left and right direction. The mounting bracket 100 is attached to the mounting tongue 72 such that the mounting bolts 102 protrude from mounting body 73, and when the airbag 45 is stored inside the case 20 such that the mounting bolts 102 protrude from the bottom wall 21 of the case 20, the mounting bolts 102 are fastened with nuts 104, such that the mounting tongues 72 or airbag 45 is mounted on the case 20, as shown in FIGS. 17 and 18.

Mounting of the airbag device M on the vehicle V is now described. The inflator 30 is preliminarily prepared by assembling the inflator body 31 and mounting bracket 85 with the clamps 40, and is stored inside the tube body 81 of the inner tube 80 such that the mounting bolts 39 protrude from the through holes 83 of the tube body 81 as well as the through holes 86 of the cover region 85. Then firstly, the airbag 45 is folded up and wrapped up with a not-shown breakable wrapping member for keeping the folded-up configuration. At this time, the insertion region 49 and mounting tongues 72 are kept free from binding by the wrapping member. Subsequently, the lid panel 58 of the insertion region 49 is opened, and the inflator 30 as covered with the inner tube 80 is inserted into the bag body 46 via the outer slit 53 and inner slit 54, and the mounting bolts 39 of the inflator 30 are taken out of the through holes 55. At this time, the cover region 85 of the inner tube 80 is laid flat inside the bag body 46. Then the lid panel 58 is closed to lid the outer slit 53 such that the mounting bolts 39 go through the mounting holes 62 disposed in the front end 58a region of the lid panel 58. If the mounting brackets 100 are attached to the mounting tongues 72 such that the mounting bolts 102 protrude from the through holes 74, an airbag module AM is completed. Thereafter, the airbag module AM is stored in the case 20 such that the mounting bolts 39 and 102 go through the bottom wall 21 and protrude downwardly, and the mounting bolts 39 and 102 are fastened with the nuts 42 and 104, respectively. Thus the mounting tongues 72 are coupled with the case 20, and the airbag 45 (or bag body 46) and the inflator 30 are mounted on the case 20. If then the airbag cover 25 is mounted on the case 20, not-shown brackets extending from the case 20 are mounted on the cowl panel 7a, and the inflator 30 is connected to the actuating circuit, the airbag device M is mounted on the vehicle V.

When the actuating circuit detects an impact against a pedestrian based on a signal fed from the sensor mounted on the front bumper 6, the inflator 30 will be actuated and inflate the airbag 45, and the airbag 45 will push and open the door 26 of the airbag cover 25 and emerge from the emergence opening 20a of the case 20 formed by opening of the door 26, then protrude upwardly and be deployed over the rear end 5a region of the hood 5, the cowl 7 and the lower regions of the front pillars 5L and 5R, as shown in FIGS. 1 (with double-dotted lines), 21 and 23.

In the airbag device M of the illustrated embodiment, the insertion region 49 of the airbag 45 has a double wall structure of the vehicle-side wall (i.e. outer panel) 46a and reinforcing panel (i.e. inner panel) 51. The outer slit 53 formed on the vehicle-side wall 46a and the inner slit 54 formed on the reinforcing panel 51 are disposed at different positions in the circumferential direction of the inflator body 31 (in the front and rear direction of the bag body 46 as laid flat), so as not to intersect with each other. That is, the outer slit 53 and inner slit 54 do not overlap each other. This configuration will prevent an inflation gas which has flown into the airbag 45 (airbag body 46) from leaking from the inner silt 54 or outer slit 53, since the outer slit 53 and its peripheral area disposed on the vehicle-side panel 46a is covered by the reinforcing panel 51 whereas the inner slit 54 and its peripheral area disposed on the reinforcing panel 51 is covered by the vehicle-side wall 46a.

Therefore, the airbag device M is capable of preventing a gas leakage from the airbag 45 adequately despite the configuration that the inflator 30 is stored inside the airbag 45.

In the airbag device M of the illustrated embodiment, moreover, the outer slit 53 and inner slit 54 are each formed into straight lines which are generally parallel to each other. This configuration will facilitate an inserting work of the inflator body 31 in comparison with an instance where the slits 53 and 54 are not parallel. If such an advantageous effect does not have to be considered, the slits 53 and 54 do not necessarily have to be parallel to each other, but have only to be non-intersecting to each other.

In the airbag device M of the illustrated embodiment, moreover, the outer slit 53 and inner slit 54 are formed to extend generally in parallel to an axial direction of the inflator body 31 at positions dislocated from the inflator body 31 in a circumferential direction of the inflator body 31. With this configuration, when the inflator 30 (inflator body 31) is put into the airbag 45 (airbag body 46), the inflator 30 is firstly arranged along the orientation of the outer slit 53 and inner slit 54 and then moved around to be put into the outer slit 53 and inner slit 54. That way the inflator 30 can be stored in the airbag 45 with little fear that the mounting bolts 39, which protrude from the inflator body 31, would be engaged with peripheral areas of the outer slit 53 and inner slit 54. That is, with the configuration of the airbag device M of the illustrated embodiment, the inserting work of the inflator body 31 into the outer slit 53 and inner slit 54 and the work of taking the mounting bolts (mounting members) 39 out of the through holes 55 can be easily conducted merely by rotating the inflator body 31 and by moving the inflator body 31 back and forth about the center in the axial direction. If such an advantageous effect does not have to be considered, the outer slit and inner slit may be configured like an outer slit 53D and an inner slit 54D in an airbag 45D shown in FIG. 29. The outer slit 53D and inner slit 54D are formed at positions dislocated from the inflator body 31 in an axial direction of the inflator body 31 (i.e. formed on the left side, in FIG. 29) in such a manner as to intersect the axial direction. Further alternatively, as indicated with double-dotted lines in FIG. 29, the outer slit 53D and inner slit 54D may be formed generally perpendicularly to the axial direction of the inflator body 31. Even in such an instance, it is desirable to provide a lid panel 58D that covers the outer slit 53D and inner slit 54D.

In the airbag device M of the illustrated embodiment, the insertion region 49 includes the lid panel 58 that is disposed on outside of the vehicle-side panel 46*a* to cover the outer slit 53. The lid panel 58 is joined to the vehicle-side panel 46*a* and reinforcing panel 51 by the rear end 58*b* region, and is provided, in a vicinity of the front end 58*a* region, with the mounting holes 62 communicating with the through holes 55 and receiving the mounting bolts 39 of the inflator 30. Covering the outer slit 53 from the outside, the lid panel 58 prevents an inflation gas which has flown into the airbag 45 from leaking from the outer slit 53, thus further helps prevent a gas leakage from the airbag 45. In the airbag device M, especially, the joint 59 which joins the rear end 58*b* region of the lid panel 58 to the vehicle-side wall 46*a* includes the main body 60 which is disposed proximate to and at the rear of the outer slit 53, and a pair of the terminal regions 61 which extend from left and right ends of the main body 60 in such a manner as to surround the outer slit 53. That is, the outer slit 53 is surrounded by the joint 59 on the three sides except the front side. This configuration will hardly form a gap between the lid panel 58 and the peripheral area of the outer slit 53 in the vehicle-side wall 46*a* at airbag deployment, and prevent the peripheral area of the outer slit 53 from being subjected to such a pulling force as to open the outer slit 53. Therefore, a gas leakage from the outer slit 53 will be further adequately prevented. If such an advantageous effect does not have to be considered, the airbag may be formed without the lid panel 58.

In the airbag device M of the foregoing embodiment, the airbag 45 further includes the inner tube 80 that covers the outer circumference of the inflator body 31 inside the airbag 45. The inner tube 80 is formed into a tube having flexibility and includes the tube body 81 that covers the inflator body 31 and the cover region 85 that extends from the tube body 81 and covers the inner slit 54 from an inner side of the airbag 45. The cover region 85 is joined to the tube body 81 at the root end (i.e. first end) region 85*a*, and the leading end (second end) 85*b* is left unjoined as a free end. When the inflator body 31 discharges an inflation gas into the airbag 45, the inner tube 80 configured as described above will deliver the gas into the airbag 45 (bag body 46) via the outlet ports 82A and 82B of the tube body 81 such that the gas may not head towards the inner slit 54. Further, since the leading end 85*b* of the cover region 85 is a free end, the inflation gas will press the cover region 85 against the inner surface of the reinforcing panel 51 to close off the inner slit 54, such that the gas will be prevented from leaking from the inner slit 54. Thus, a gas leakage from the airbag 45 will be further adequately prevented. In the illustrated embodiment, especially, the cover region 85 is so elongated as to extend beyond the outer slit 53 disposed at the rear of the inner slit 54. Accordingly, the cover region 85 will be pressed against the vehicle-side wall 46*a* over an extended area and prevented from floating up inside the bag body 46, such that the cover region 85 will lid the inner slit 54 adequately. If such an advantageous effect does not have to be considered, the cover region does not necessarily have to be so long as to extend beyond the outer slit. Alternatively, the inner tube may be formed without such a cover region as the cover region 85 of the foregoing embodiment. Further alternatively, the airbag may even be formed without an inner tube.

Furthermore, in the illustrated embodiment, the outer slit 53 and inner slit 54 are both disposed at the rear of the through holes 55 in the bag body 46 as laid flat. That is, the outer slit 53 and inner slit 54 are both disposed on the same side with respect to the through holes 55, as viewed from the axial direction of the inflator body 31. In comparison with a configuration in which the outer slit and inner slit are each disposed on one side and the other with respect to the through holes 55, this configuration enhances a strength of a peripheral area of the through holes 55 in the airbag 45. If such an advantageous effect does not have to be considered, the outer slit and inner slit may be formed on one side and the other with respect to the through holes.

Additionally, in the airbag device M of the foregoing embodiment, the inner slit 54 is positioned closer to the through holes 55 than the outer slit 53. This configuration will facilitate the inserting work of the inflator 30, which is composed of inserting the inflator 30 through the outer slit 53, then the inner slit 54, and taking the mounting bolts 39 of the inflator 30 out of the through holes 55, in comparison with an instance where the outer slit is positioned closer to the through holes 55 than the inner slit. That is, with the configuration of the foregoing embodiment, when the inflator 30 is put into the airbag 45 via the outer slit 53 and then inner slit 54, the mounting bolts 39 are disposed near the through holes 55, thus can be taken out of the through holes 55 easily. If such an advantageous effect does not have to be considered, the positions of the outer slit and inner slit may be reversed.

Figure 24:
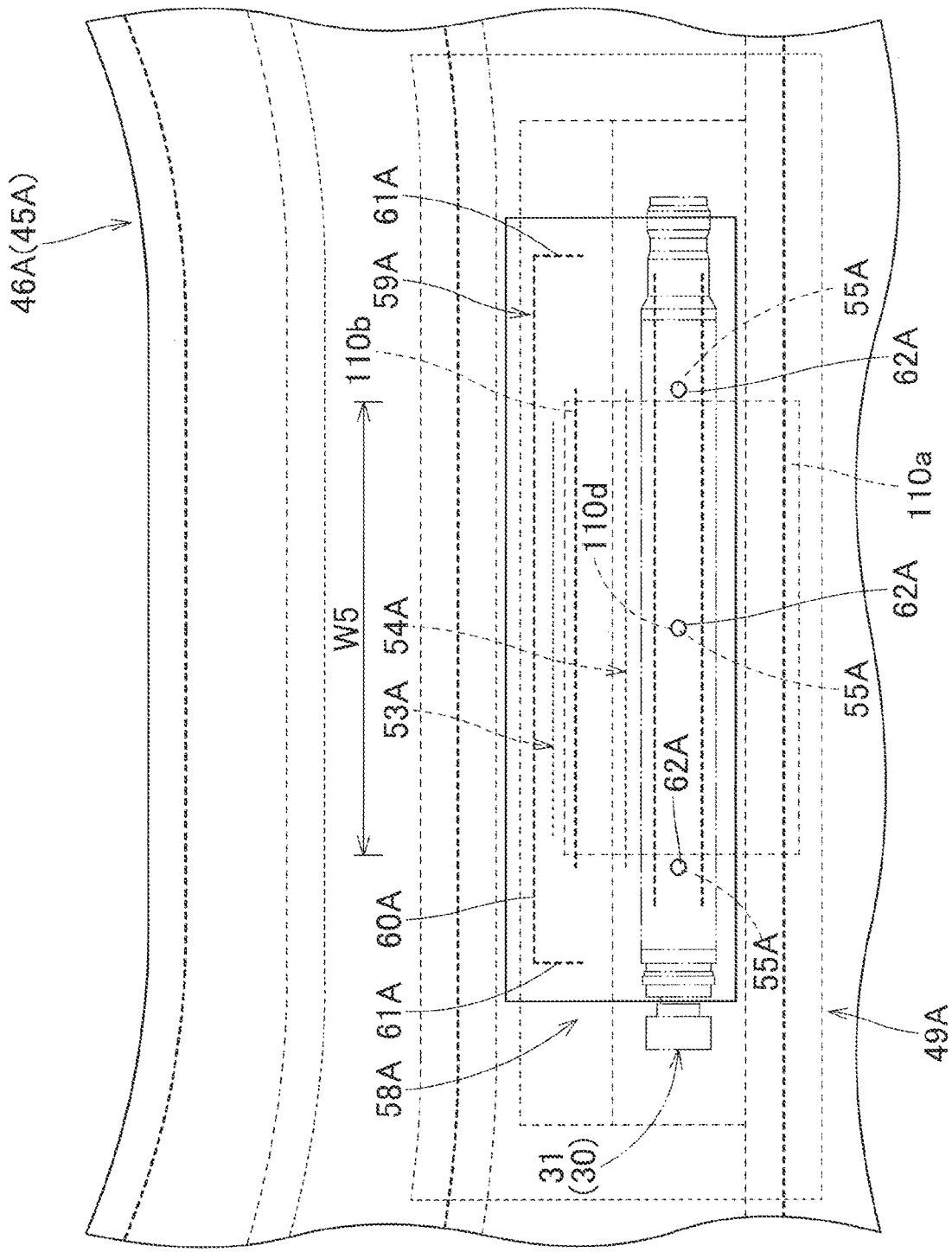
FIG. 24 is a partial enlarged bottom view of an insertion region in a modification of the airbag of the invention.
Figure 25:
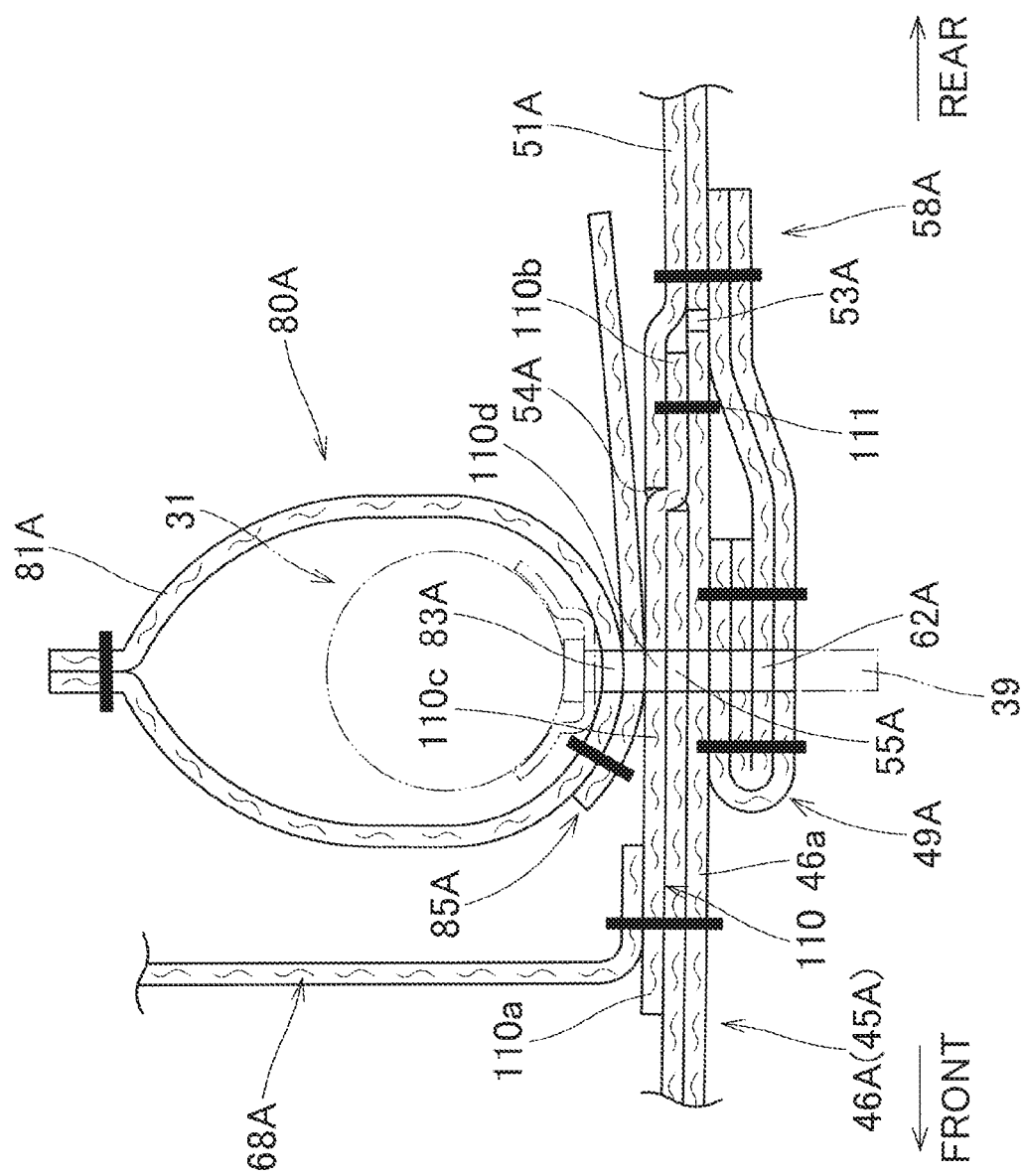
FIG. 25 is a partial enlarged sectional view of the airbag of FIG. 24 showing the insertion region and an inner tube.
Figure 26:
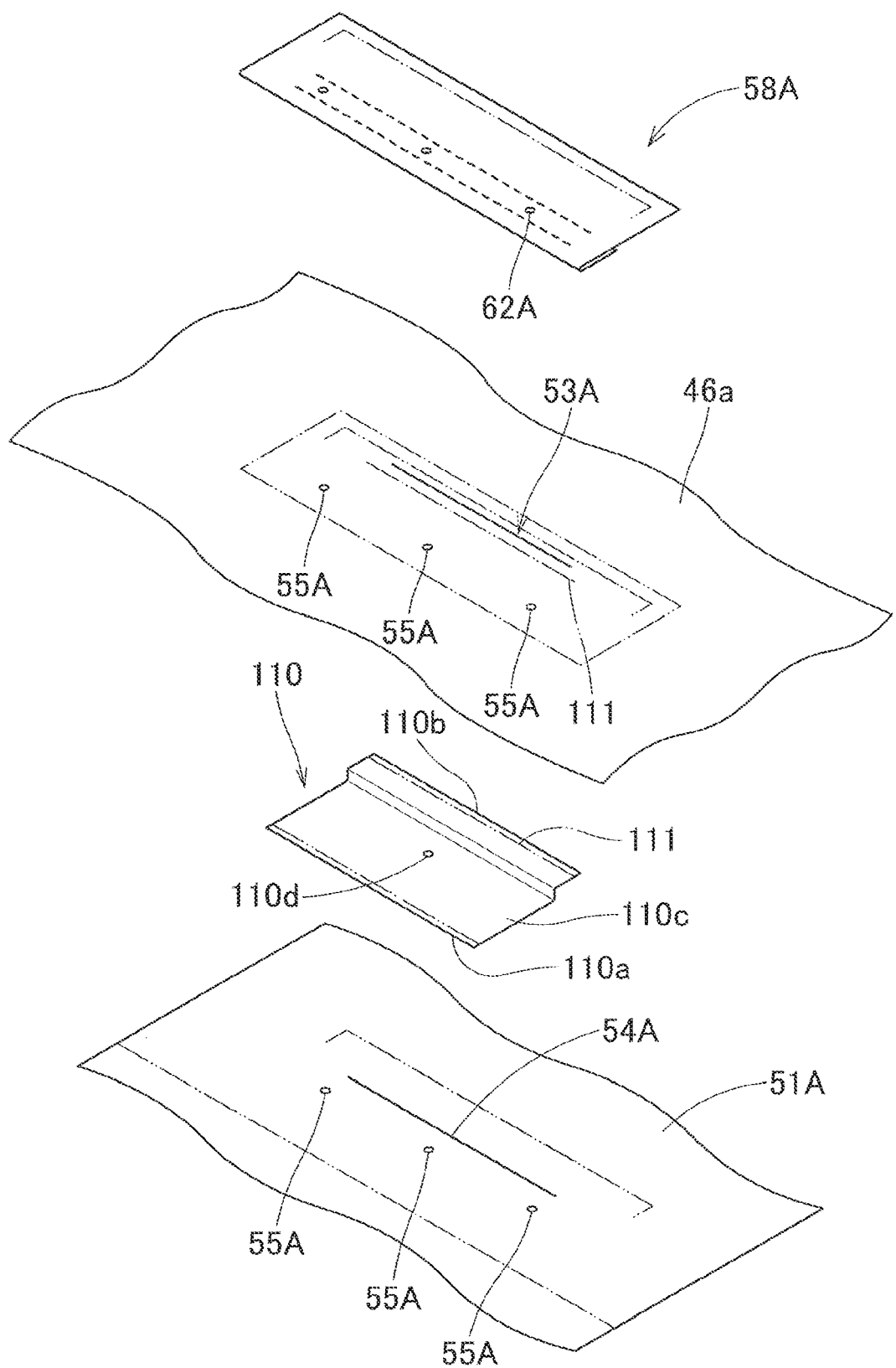
FIG. 26 is a schematic exploded perspective view of the insertion region in the airbag of FIG. 24.

An alternative embodiment is now described referring to FIGS. 24 to 26. An airbag 45A of the alternative embodiment has a similar configuration to the airbag 45 except in that the airbag 45A includes a guide member 110 which is disposed between the vehicle-side wall 46*a* (i.e. outer panel) and the reinforcing panel 51A (i.e. inner panel) in the insertion region 49A. Therefore, common members will be given a reference sign "A" at the end of common reference numerals, and detailed descriptions of the common members will be omitted.

The guide member 110 is provided for assisting with the inserting work of the inflator 30 (inflator body 31) into the airbag 45A, and is formed of a flexible sheet member. In this specific embodiment, the guide member 110 is formed of the same material as that of the airbag 45A, i.e. a woven fabric of polyamide yarn, polyester yarn or the like, coated with a suitable coating agent for preventing gas leakage. As shown in FIGS. 25 and 26, the guide member 110 is put through the inner slit 54A and arranged such that the rear end 110*b* is disposed on an inner surface of the vehicle-side wall 46*a* (i.e. between the vehicle-side wall 46*a* and reinforcing panel 51A) at a position between the outer slit 53A and inner slit 54A, and the front area 110*c* is placed over an inner surface of the reinforcing panel 51A. The rear end 110*b* region of the guide member 110 is generally entirely joined (sewn) to the vehicle-side wall 46*a* with a straight joint 111. In the front area 110*c*, the guide member 110 is provided with through holes 110*d* corresponding to the through holes 55A. In this specific embodiment, the front end 110*a* region of the guide member 110 is sewn to the vehicle-side wall 46*a* together with the front edge 51*a* of the reinforcing panel 51A and the front center tether 68A, that is, joined to the reinforcing panel 51A, as shown in FIG. 25. The guide member 110 of this specific embodiment is formed generally into a rectangle elongated in a left and right direction, and the width W5 in the left and right direction of the guide member 110 (FIG. 24) is slightly smaller than the length of the inner slit 54A so as to allow the guide member 110 to go through the inner slit 54A.

When putting the inflator 30 into the airbag 45A via the inner slit 54A, such a guide member 110 closes off a gap between the vehicle-side wall (i.e. outer panel) 46*a* and reinforcing panel 51A (i.e. inner panel), prevents the inflator 30 (inflator body 31) from going into the gap between the vehicle-side wall 46*a* and reinforcing panel 51A and smoothly guide the inflator 30 into the inner slit 54A. That is, the guide member 110 will facilitate the inserting work of the inflator 30 (inflator body 31) into the airbag 45A (bag body 46).

Although the guide member 110 of the above-described embodiment is formed into a rectangle whose width W5 in the left and right direction is slightly smaller than the length of the inner slit 54A, the outer contour of the guide member should not be limited thereby. As long as it can prevent a wrong insertion of the inflator, the guide member may be formed into a band with a less width in the left and right direction and elongated in a front and rear direction.

The insertion region 49A of the airbag 45A also includes a lid panel 58A that is disposed on outside of the vehicle-side panel 46*a* to cover the outer slit 53A. The lid panel 58A is joined to the vehicle-side panel 46*a* and reinforcing panel 51A by the rear end 58*b* region, and is provided, in a vicinity of the front end 58*a* region, with mounting holes 62 each of which communicates with each of the through holes 55A and receives the mounting bolt 39 of the inflator 30. Covering the outer slit 53A from the outside, the lid panel 58A prevents an inflation gas which has flown into the airbag 45A from leaking from the outer slit 53A, thus further helps prevent a gas leakage from the airbag 45A.

Figure 27:
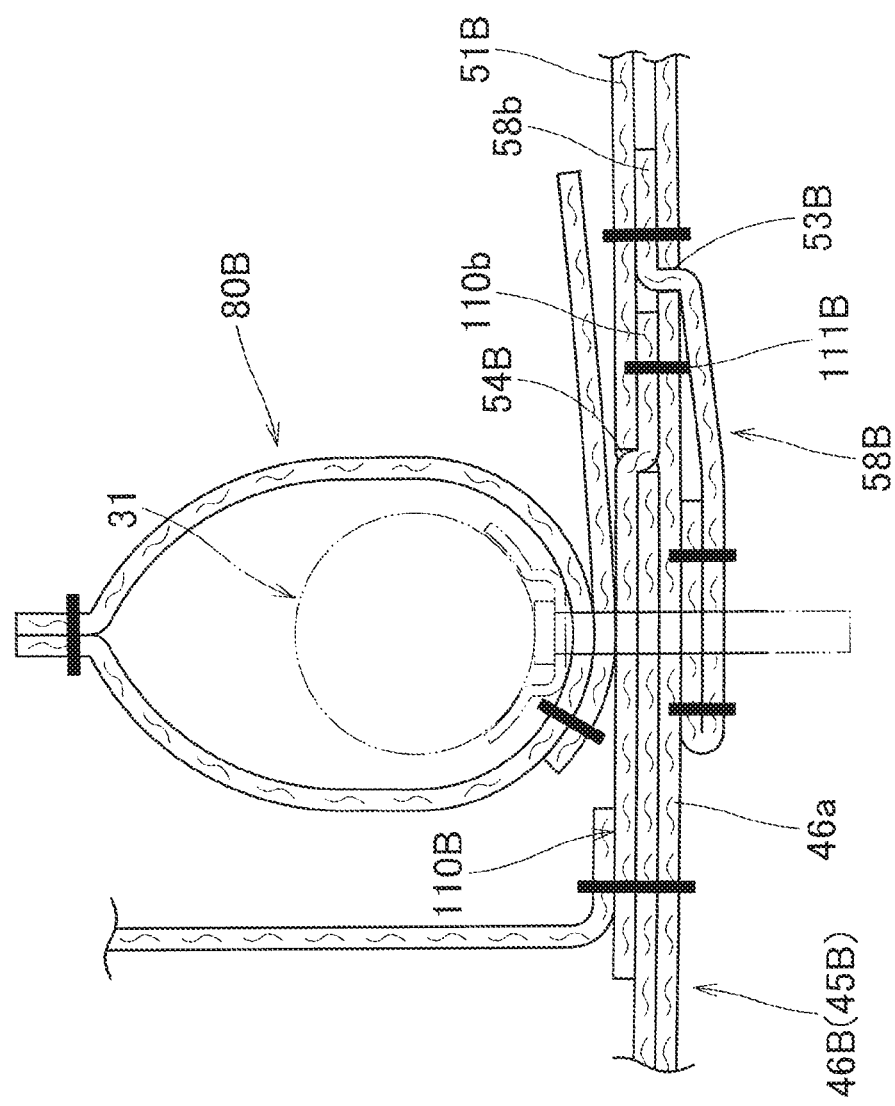
FIG. 27 is a partial enlarged sectional view of another modification of the airbag of the invention showing an insertion region and an inner tube.

If such an advantageous effect does not have to be considered, the lid panel may be configured like a lid panel 58B in an airbag 45B shown in FIG. 27. The rear end 58*b* region of the lid panel 58B is put through the outer slit 53B and disposed on the inner surface of the vehicle-side wall 46*a*, and joined to the vehicle-side wall 46*a* and reinforcing panel 51B in that state.

The outer slit 53A and the inner slit 54A are formed into straight lines which are generally parallel to each other, in the airbag 45A as well. This configuration will facilitate the inserting work of the inflator body in comparison with an instance where the slits 53A and 54A are not parallel.

Moreover, the outer slit 53A and inner slit 54A are formed generally in parallel to an axial direction of the inflator body 31 at positions dislocated from the inflator body 31 in a circumferential direction of the inflator body 31, in the airbag 45A as well. With this configuration, when the inflator 30 (inflator body 31) is put into the airbag 45A (airbag body 46A), the inflator 30 is firstly arranged along the orientation of the outer slit 53A and inner slit 54A and then moved around to be put into the outer slit 53A and inner slit 54A. That way the inflator 30 can be stored in the airbag 45A with little fear that the mounting bolts 39, which protrude from the inflator body 31, would be engaged with peripheral areas of the outer slit 53A and inner slit 54A. That is, also with the configuration of the airbag 45A, the inserting work of the inflator body 31 into the outer slit 53A and inner slit 54A and the work of taking the mounting bolts (mounting members) 39 out of the through holes 55A can be easily conducted merely by rotating the inflator body 31 and by moving the inflator body 31 back and forth about the center in the axial direction.

Furthermore, also in the airbag device 45A, the outer slit 53A and inner slit 54A are both disposed at the rear of the through holes 55A in the bag body 46A as laid flat. That is, the outer slit 53A and inner slit 54A are both disposed on the same side with respect to the through holes 55A, as viewed from the axial direction of the inflator body 31. In comparison with a configuration in which the outer slit and inner slit are each disposed on one side and the other with respect to the through holes 55A, this configuration enhances a strength of a peripheral area of the through holes 55A in the airbag 45A.

Figure 28:
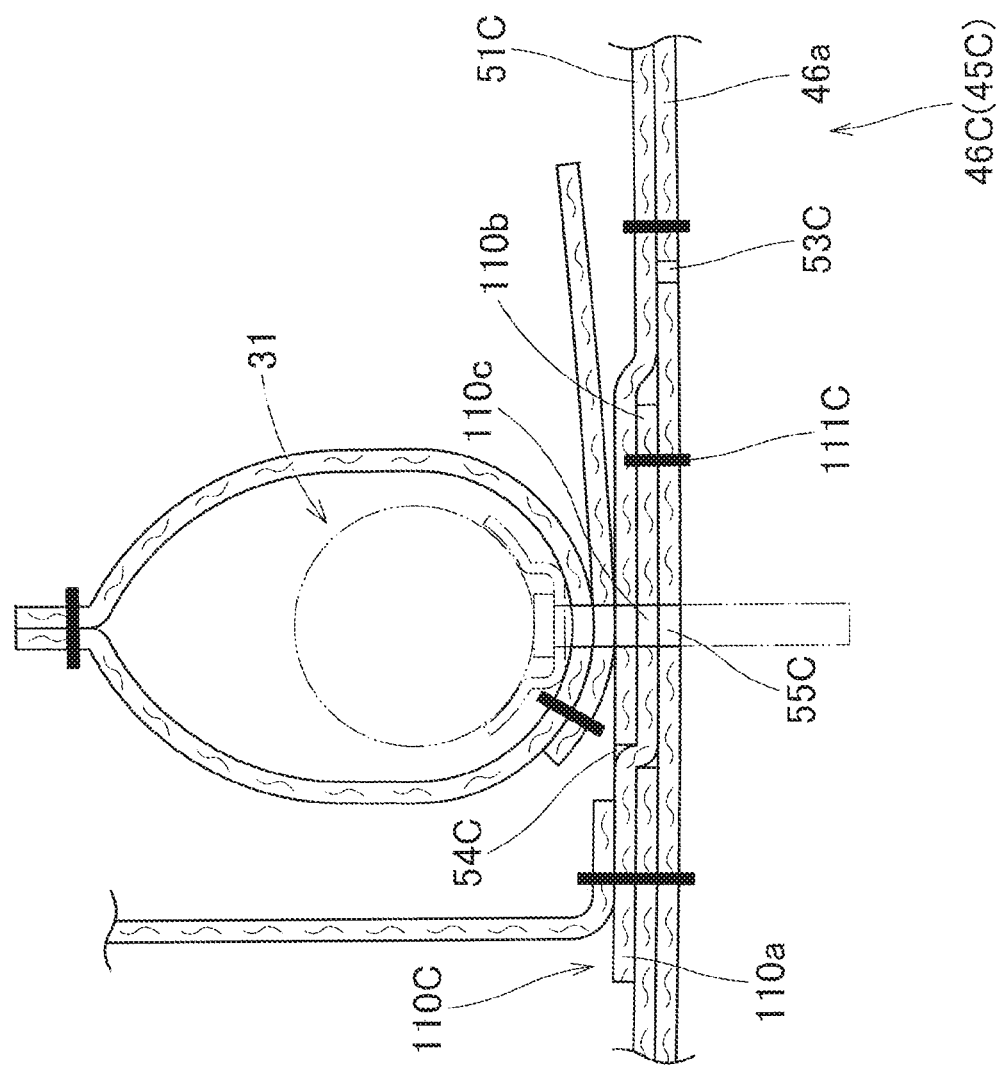
FIG. 28 is a partial enlarged sectional view of yet another modification of the airbag of the invention showing an insertion region and an inner tube.

If such an advantageous effect does not have to be considered, it is also conceivable to form an outer slit 53C and an inner slit 54C on one side and the other with respect to the through holes 55C as viewed from an axial direction of the inflator body 31, such that the though holes 55C are disposed between the outer slit 53C and the inner slit 54C, as in an airbag 45C shown in FIG. 28. The airbag 45C is not provided with a lid panel. With this configuration, when the airbag 45C is mounted on a vehicle body structure, the region of the airbag 45C between the outer slit 53C and inner slit 54C is held down by the inflator body 31. Therefore, a gas leakage will be adequately prevented even without a lid panel.

In comparison with other airbag devices to be mounted in a compartment of a vehicle, an airbag device for pedestrian protection like the airbag device M of the foregoing embodiments is required to keep a high internal pressure of the airbag for a longer time period after completion of inflation because it takes a longer time until the airbag catches a pedestrian (i.e. object of protection) than in other airbag devices. In the airbag device M of the foregoing embodiments, the insertion region 49 of the airbag is designed to prevent a gas leakage. The length L2 of the outer slit 53 and length L3 of the inner slit 54 are both smaller than the length L1 of the inflator body 31, and the length L2 of the outer slit 53 is smaller than the length L3 of the inner slit 54. The lengths L2 and L3 are determined to be as small as possible to such an extent that enables a smooth entry of the inflator 30 provided with the mounting bolts 39. Moreover, as described above, the joint 59 which joins the lid panel 58 to the vehicle-side wall 46*a* is so formed as to surround the outer slit 53 on three sides, and the cover region 85 of the inner tube 80 covers the inner slit 54 from the inner side. These configurations will maximally prevent an inflation gas which has flown into the bag body 46 from leaking from the inner slit 54 or outer slit 53. In addition, in the airbag device M of the foregoing embodiment, the vehicle-side wall 46*a* of the airbag 45 is mounted on the bottom wall 21 of the case 20 through the use of the mounting tongues 72, which are provided separate from the bag body 46. The mounting bracket 100 is attached to each of the mounting tongues 72 and then fastened to the case 20 in order to mount the vehicle-side wall 46*a* on the case 20 (i.e. to the vehicle body structure). That is, the mounting bracket 100 is not directly attached to the vehicle-body wall 46*a*. This configuration prevents a gas leakage which would otherwise occur from the joint of the mounting bracket. Therefore, with the airbag device M of the foregoing embodiments, the airbag 45 will maintain a high pressure for a certain time period after completion of inflation, and catch a pedestrian with a sufficient internal pressure.

The foregoing embodiments have been described as the invention is applied to an airbag device for pedestrian protection mountable on a vicinity of a cowl of a vehicle. However, the invention can be applied to any airbag devices in which an inflator is stored inside an airbag, such as a side airbag device mountable on a backrest of a seat of a vehicle.

What is claimed is:

1. An airbag device adapted to be mounted on a vehicle, comprising:
    an airbag inflatable with an inflation gas; and
    an inflator that is stored inside the airbag for feeding the airbag with the inflation gas, the inflator comprising an inflator body that is generally cylindrical in outer contour and placed inside the airbag, and one or more mounting members that protrude from an outer circumference of the inflator body generally orthogonally to an axial direction of the inflator body, the mounting members protruding out of the airbag to be mounted on a body structure of the vehicle in order to mount the airbag and inflator body on the body structure of the vehicle, wherein:

the airbag comprises an insertion region via which the inflator is inserted into the airbag; the insertion region having a double wall structure of an outer panel and an inner panel each formed of a flexible sheet material;

the outer panel includes an outer slit via which the inflator is inserted into the airbag;

the inner panel includes an inner slit via which the inflator is inserted into the airbag;

the outer slit and inner slit are so arranged as not to overlap or intersect each other; and the insertion region further comprises one or more through holes each of which is formed through the outer panel and inner panel and receives each of the mounting members of the inflator such that the mounting member protrudes out of the airbag, wherein the outer slit and the inner slit are formed into straight lines which are generally parallel to each other, wherein the outer slit and the inner slit are generally parallel to the axial direction of the inflator body and are disposed at positions dislocated from each other in a circumferential direction of the inflator body.

2. The airbag device of claim 1, wherein:

the insertion region further comprises a lid panel that has flexibility and covers the outer slit on outside of the outer panel; and the lid panel is joined to the outer panel by a first end region thereof, and includes, in a vicinity of a second end thereof, one or more mounting holes each of which communicates with each of the through holes and receives the mounting member of the inflator.

3. The airbag device of claim 1, wherein:

the airbag further comprises an inner tube that is formed into a tube having flexibility and covers an outer circumference of the inflator body inside the airbag; and the inner tube comprises:

a tube body that covers the inflator body and includes one or more outlet ports for releasing the inflation gas as exited the inflator body; and a cover region that is joined to the tube body at a first end region thereof and extends from the tube body in order to cover the inner slit from an inner side of the airbag, a second end region of the cover region being a free end.

4. The airbag device of claim 1, wherein the outer slit and the inner slit are disposed on a same side with respect to the through holes, as viewed from the axial direction of the inflator body.

5. The airbag device of claim 4, wherein the inner slit is positioned closer to the through holes than the outer slit.

6. The airbag device of claim 1, wherein:

the insertion region further comprises a guide member that is disposed between the outer panel and the inner panel for assisting with an inserting work of the inflator;

the guide member is formed of a flexible sheet material;

the guide member is put through the inner slit and arranged such that a first end thereof is disposed at a position between the outer slit and inner slit on an inner surface of the outer panel whereas a second end region thereof is placed over an inner surface of the inner panel; and the first end region of the guide member is joined to the outer panel.

7. The airbag device of claim 6, wherein:

the insertion region further comprises a lid panel that has flexibility and covers the outer slit on outside of the outer panel; and the lid panel is joined to the outer panel by a first end region thereof, and includes, in a vicinity of a second end thereof, one or more mounting holes each of which communicates with each of the through holes and receives the mounting member of the inflator.

8. The airbag device of claim 7, wherein the lid panel is put through the outer slit such that the first end region is disposed on the inner surface of the outer panel.

9. The airbag device of claim 7, wherein the outer slit and the inner slit are disposed on a same side with respect to the through holes, as viewed from the axial direction of the inflator body.

10. The airbag device of claim 6, wherein the through holes are disposed between the outer slit and inner slit.

11. An airbag device adapted to be mounted on a vehicle, comprising:

an airbag inflatable with an inflation gas; and an inflator that is stored inside the airbag for feeding the airbag with the inflation gas, the inflator comprising an inflator body that is generally cylindrical in outer contour and placed inside the airbag, and one or more mounting members that protrude from an outer circumference of the inflator body generally orthogonally to an axial direction of the inflator body, the mounting members protruding out of the airbag to be mounted on a body structure of the vehicle in order to mount the airbag and inflator body on the body structure of the vehicle, wherein:

the airbag comprises an insertion region via which the inflator is inserted into the airbag; the insertion region having a double wall structure of an outer panel and an inner panel each formed of a flexible sheet material;

the outer panel includes an outer slit via which the inflator is inserted into the airbag;

the inner panel includes an inner slit via which the inflator is inserted into the airbag;

the outer slit and inner slit are so arranged as not to overlap or intersect each other; and the insertion region further comprises one or more through holes each of which is formed through the outer panel and inner panel and receives each of the mounting members of the inflator such that the mounting member protrudes out of the airbag, wherein:

the insertion region further comprises a lid panel that has flexibility and covers the outer slit on outside of the outer panel; and the lid panel is joined to the outer panel by a first end region thereof, and includes, in a vicinity of a second end thereof, one or more mounting holes each of which communicates with each of the through holes and receives the mounting member of the inflator.

12. An airbag device adapted to be mounted on a vehicle, comprising:

an airbag inflatable with an inflation gas; and an inflator that is stored inside the airbag for feeding the airbag with the inflation gas, the inflator comprising an inflator body that is generally cylindrical in outer contour and placed inside the airbag, and one or more mounting members that protrude from an outer circumference of the inflator body generally orthogonally to an axial direction of the inflator body, the mounting members protruding out of the airbag to be mounted on a body structure of the vehicle in order to mount the airbag and inflator body on the body structure of the vehicle, wherein:

the airbag comprises an insertion region via which the inflator is inserted into the airbag; the insertion region having a double wall structure of an outer panel and an inner panel each formed of a flexible sheet material;

the outer panel includes an outer slit via which the inflator is inserted into the airbag;

the inner panel includes an inner slit via which the inflator is inserted into the airbag;

the outer slit and inner slit are so arranged as not to overlap or intersect each other; and the insertion region further comprises one or more through holes each of which is formed through the outer panel and inner panel and receives each of the mounting members of the inflator such that the mounting member protrudes out of the airbag, wherein:

the airbag further comprises an inner tube that is formed into a tube having flexibility and covers an outer circumference of the inflator body inside the airbag; and the inner tube comprises:

a tube body that covers the inflator body and includes one or more outlet ports for releasing the inflation gas as exited the inflator body; and a cover region that is joined to the tube body at a first end region thereof and extends from the tube body in order to cover the inner slit from an inner side of the airbag, a second end region of the cover region being a free end.

13. The airbag device of claim 12, wherein the outer slit and the inner slit are formed into straight lines which are generally parallel to each other.

14. The airbag device of claim 13, wherein the outer slit and the inner slit are generally parallel to the axial direction of the inflator body and are disposed at positions dislocated from each other in a circumferential direction of the inflator body.

* * * * *